United States Patent
Maeda et al.

(10) Patent No.: US 10,986,105 B2
(45) Date of Patent: Apr. 20, 2021

(54) UNAUTHORIZED COMMUNICATION DETECTION METHOD, UNAUTHORIZED COMMUNICATION DETECTION SYSTEM, AND NON-TRANSITORY COMPUTER-READABLE RECORDING MEDIUM STORING A PROGRAM

(71) Applicant: Panasonic Intellectual Property Corporation of America, Torrance, CA (US)

(72) Inventors: Manabu Maeda, Osaka (JP); Takeshi Kishikawa, Osaka (JP); Daisuke Kunimune, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 10 days.

(21) Appl. No.: 16/244,160

(22) Filed: Jan. 10, 2019

(65) Prior Publication Data

US 2019/0149561 A1  May 16, 2019

Related U.S. Application Data

(63) Continuation of application No. PCT/JP2018/007102, filed on Feb. 27, 2018.

(30) Foreign Application Priority Data

Apr. 7, 2017 (JP) .............................. JP2017-076568
Feb. 7, 2018 (JP) .............................. JP2018-019993

(51) Int. Cl.
*G06F 21/00* (2013.01)
*H04L 29/06* (2006.01)
(Continued)

(52) U.S. Cl.
CPC ...... *H04L 63/1416* (2013.01); *B60R 16/0232* (2013.01); *G06F 21/554* (2013.01);
(Continued)

(58) Field of Classification Search
None
See application file for complete search history.

(56) References Cited

U.S. PATENT DOCUMENTS 7,484,008 B1 * 1/2009 Gelvin .................. G06F 15/173
709/249
7,630,807 B2 * 12/2009 Yoshimura .............. B60L 3/003
701/48

(Continued)

FOREIGN PATENT DOCUMENTS

| JP | 2006-518887 | 8/2006 |
|----|-------------|--------|
| JP | 2014-146868 | 8/2014 |
| WO | 2014/115455 | 7/2014 |

OTHER PUBLICATIONS

International Search Report of PCT application No. PCT/JP2018/007102 dated May 22, 2018.

(Continued)

*Primary Examiner* — Maung T Lwin
(74) *Attorney, Agent, or Firm* — Greenblum & Bernstein P.L.C.

(57) ABSTRACT

An unauthorized activity detection method in an onboard network system. The detection method includes determining whether or not a message sent out onto the network is an attack message, saving information relating to the attack message in at least one memory in a case where the message is an attack message, identifying a communication pattern from information relating to the attack message, and determining whether or not the message matches a communication pattern. The determination of whether an attack message and determination of whether matching a
(Continued)

communication pattern are executed on each of a plurality of messages received from the network. In the determining of whether an attack message executed on a message received after executing of determining of whether matching a communication pattern, results of the determination of whether an attack message that has already be executed are used.

11 Claims, 19 Drawing Sheets

(51) Int. Cl.
B60R 16/023 (2006.01)
G06F 21/55 (2013.01)
G05D 1/02 (2020.01)
G05D 1/00 (2006.01)

(52) U.S. Cl.
CPC ....... H04L 63/1466 (2013.01); G05D 1/0061 (2013.01); G05D 1/021 (2013.01)

(56) References Cited

U.S. PATENT DOCUMENTS

| | | | | |
|---|---|---|---|---|
| 8,677,505 B2* | 3/2014 | Redlich | ................ | G06F 21/577 726/27 |
| 9,215,244 B2* | 12/2015 | Ayyagari | ........... | H04B 7/18593 |
| 9,646,428 B1* | 5/2017 | Konrardy | .............. | G08G 1/147 |
| 9,820,120 B2* | 11/2017 | deCharms | ............. | H04W 4/029 |
| 9,898,759 B2* | 2/2018 | Khoury | ................. | B60W 40/09 |
| 10,037,689 B2* | 7/2018 | Taylor | .............. | G08G 1/096844 |
| 10,142,358 B1* | 11/2018 | Bajpai | ................... | H04L 43/028 |
| 2004/0111508 A1 | 6/2004 | Dias et al. | | |
| 2005/0096944 A1* | 5/2005 | Ryan | ..................... | G06Q 40/08 705/4 |
| 2008/0072289 A1* | 3/2008 | Aoki | .................. | H04L 43/0811 726/3 |
| 2013/0305357 A1* | 11/2013 | Ayyagari | .................. | G06F 9/00 726/22 |
| 2014/0036693 A1* | 2/2014 | Mabuchi | ................. | H04L 43/10 370/243 |
| 2015/0089236 A1* | 3/2015 | Han | ...................... | H04L 9/3271 713/181 |
| 2015/0113638 A1 | 4/2015 | Valasek et al. | | |
| 2015/0191136 A1 | 7/2015 | Ben Noon et al. | | |
| 2015/0358351 A1 | 12/2015 | Otsuka et al. | | |
| 2017/0066406 A1* | 3/2017 | Ricci | ..................... | A61B 5/4809 |
| 2017/0223037 A1* | 8/2017 | Singh | ................. | H04L 63/1441 |
| 2017/0223046 A1* | 8/2017 | Singh | ................. | H04L 63/1491 |
| 2018/0196941 A1* | 7/2018 | Ruvio | .............. | H04W 12/1208 |
| 2018/0241584 A1* | 8/2018 | Ruvio | .............. | H04L 12/40169 |

OTHER PUBLICATIONS

The Extended European Search Report dated Mar. 24, 2020 for the related European Patent Application No. 18781211.0.

* cited by examiner

FIG. 3
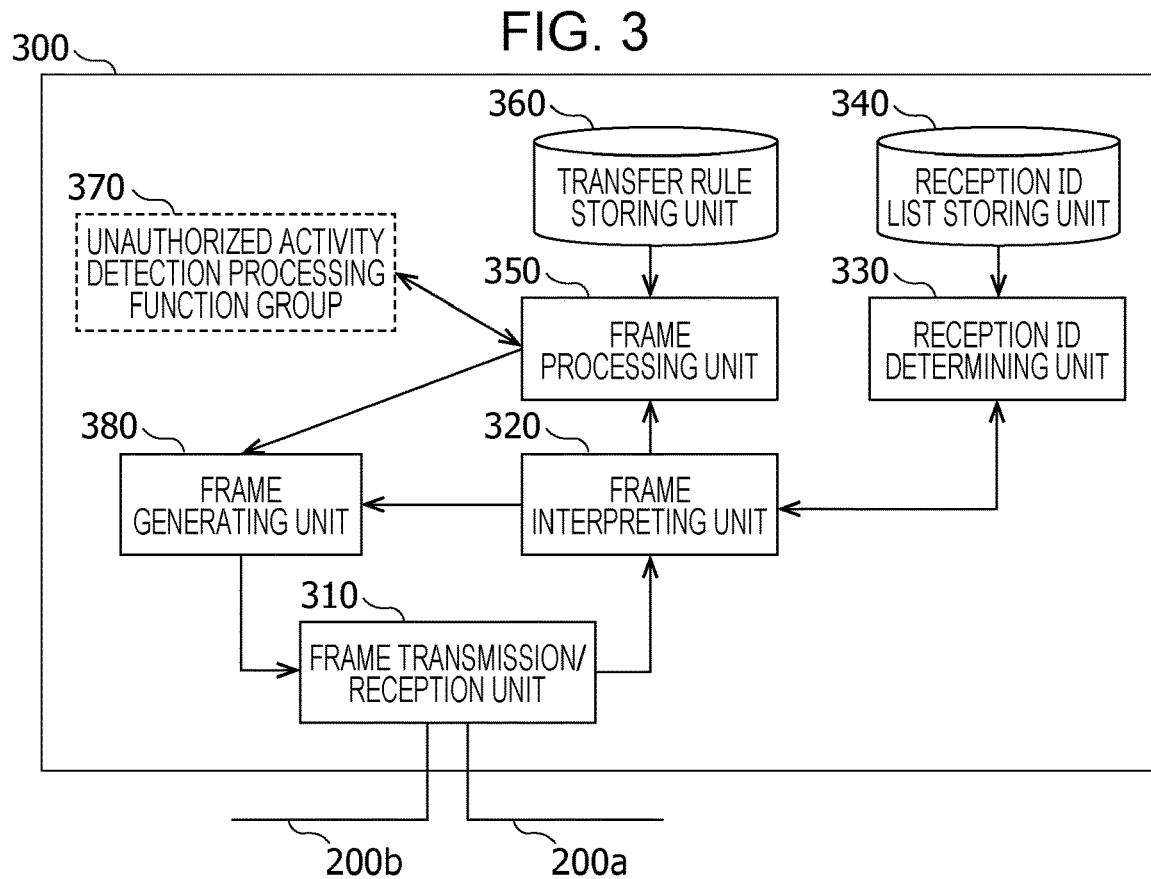
FIG. 4
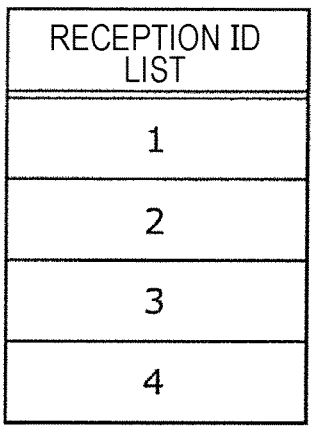
FIG. 5
| TRANSFER SOURCE | TRANSFER DESTINATION | ID |
|---|---|---|
| 200a | 200b | * |
| 200b | 200a | 3 |

UNAUTHORIZED COMMUNICATION DETECTION METHOD, UNAUTHORIZED COMMUNICATION DETECTION SYSTEM, AND NON-TRANSITORY COMPUTER-READABLE RECORDING MEDIUM STORING A PROGRAM

BACKGROUND

1. Technical Field

The present invention relates to a detection method for detecting communication of an unauthorized message on an onboard network.

2. Description of the Related Art

In recent years, a great number of devices called electronic control units (ECU) have been placed in systems in automobiles. A network connecting these ECUs is referred to as an onboard network. Many communication standards exist for onboard networks. One of the most mainstream of these onboard networks is a standard called Controller Area Network (hereinafter, CAN).

In a network according to the CAN standard (hereinafter also referred to as CAN network), a communication path (bus) is configured of two cables, and ECUs connected to the bus are also referred to as nodes. Each node connected to the bus transmits and receives data in increments called frames or messages. No identifiers indicating the transmission destination or transmission source of data is used in CAN. A node that transmits frames (hereinafter also referred to as transmitting node) attaches an ID called a message ID to each message, indicating the type of the message, and transmits, i.e., sends signals out onto the bus. A node that receives messages (hereinafter also referred to as receiving node) receives, i.e., reads signals from the bus, only regarding messages including a message ID decided beforehand. Messages of the same ID are transmitted at a predetermined constant cycle.

As described above, each of the ECUs of which a great number are included in a system within an automobile are connected to the CAN network, and operate while exchanging various messages with each other. Now, a situation can occur where an ECU that has external communication functions from the CAN network is taken over by being externally attacked or the like, and starts to transmit unauthorized messages (hereinafter, attack messages) to the CAN network. Such an ECU that has been taken over (hereinafter, also referred to as unauthorized ECU) can unauthorizedly control the automobile by posing as another ECU, for example, and transmitting attack messages. An example of a method to detect such so-called spoofing attacks is described in International Publication No. 2014/115455.

SUMMARY

The above-described related art has required further improvement.

In one general aspect, the techniques disclosed here feature an unauthorized communication detection method in an onboard network system that is executed by an information processing system including at least one memory. The onboard network system includes a network and one or more electronic control units connected to the network. The unauthorized communication detection method includes: executing unauthorized activity detection of determining of whether or not a message sent out onto the network is an attack message; saving information relating to the attack message in the at least one memory in a case where the message is an attack message; identifying a communication pattern occurring on the onboard network, from information relating to the attack message; and executing communication pattern determination of determining whether or not the message matches a communication pattern identified in the identifying. At least the executing unauthorized activity detection and the executing communication pattern determination are executed on each of a plurality of messages that have been successively sent out onto the network and received, and in the unauthorized activity detection executed on a message received after executing of the communication pattern determination, determination results of this communication pattern determination that has already been executed are used for determining whether or not this message is an attack message.

According to the present disclosure, further improvement can be realized.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a block diagram illustrating an example of the functional configuration of a gateway included in the onboard network system according to the present disclosure;

FIG. 4 is a diagram illustrating an example of the data configuration of a reception ID list in the first embodiment;

FIG. 5 is a diagram illustrating an example of the data configuration of transfer rules stored in the gateway in the first embodiment;

DETAILED DESCRIPTION

Figure 1:
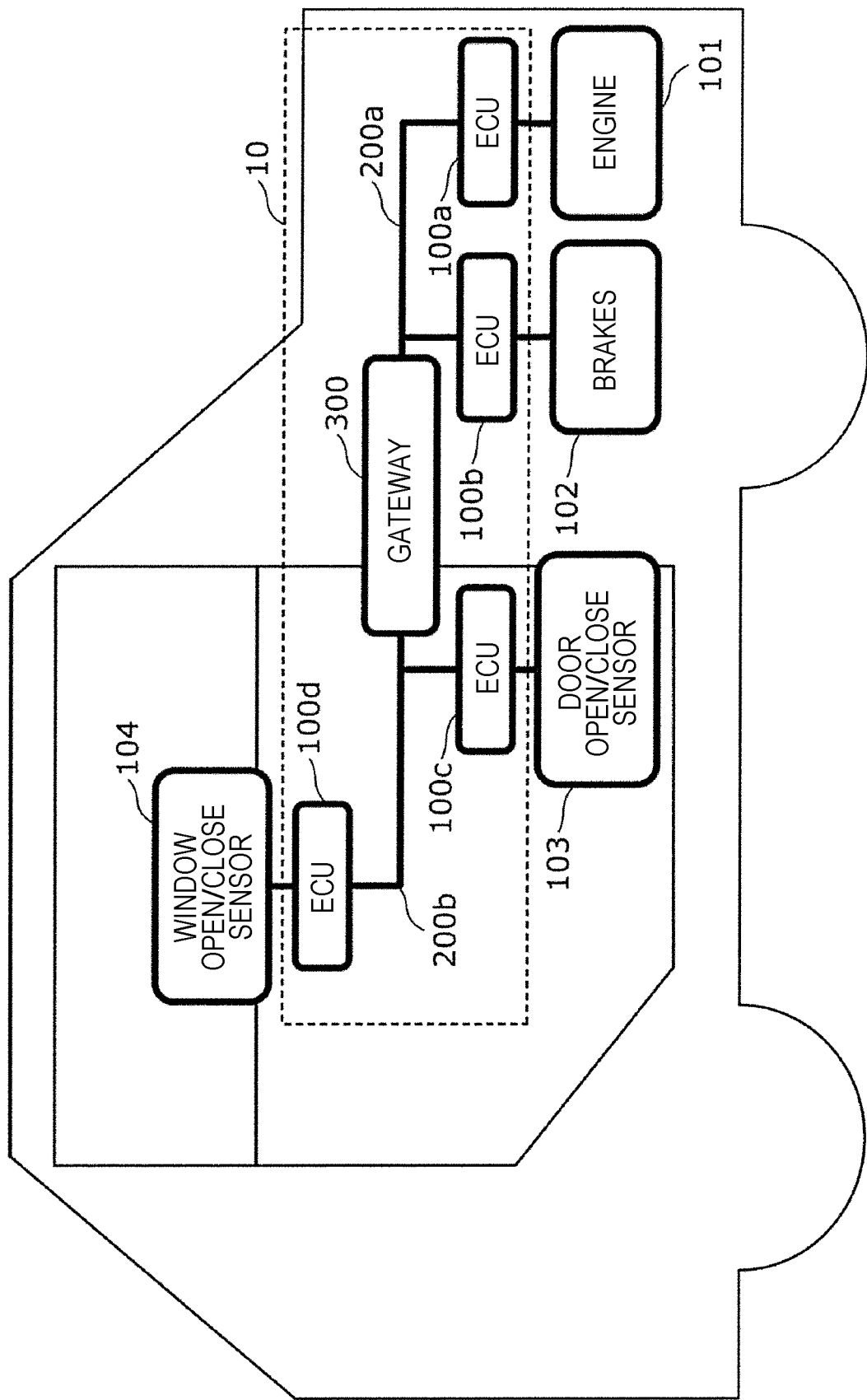
FIG. 1 is a block diagram illustrating the overall configuration of an onboard network system according to a first embodiment.

Underlying Knowledge Forming Basis of the Present Disclosure

When transmission of an attack message from an unauthorized ECU starts, normal messages and attack messages having the same ID coexist in the CAN network. In such a state, there are cases where, as a result of the transmission timing of normal messages and the transmission timing of attack messages being very close to each other, or being intentionally brought close together by the attacker, the transmission timing of attack messages falls within a tolerance margin. In such a case, distinguishing normal messages and attack messages is difficult, and the probability of erroneous detection increases. The same thing can occur not only regarding transmission timings of messages but also regarding data values included in the messages.

Accordingly, an unauthorized communication detection method in an onboard network system that is executed by an information processing system including at least one memory. The onboard network system includes a network and one or more electronic control units connected to the network. The unauthorized communication detection method includes: executing unauthorized activity detection of determining whether or not a message sent out onto the network is an attack message; saving information relating to the attack message in the at least one memory in a case where the message is an attack message; identifying a communication pattern occurring on the onboard network, from information relating to the attack message; and executing communication pattern determination of determining whether or not the message matches a communication pattern identified in the identifying. At least the executing unauthorized activity detection and the executing communication pattern determination are executed on each of a plurality of messages that have been successively sent out onto the network and received, and in the unauthorized activity detection executed on a message received after executing of the communication pattern detection, determination results of this communication pattern determination that has already been executed are used for determining whether or not this message is an attack message.

Accordingly, whether a message sent out onto the onboard network system is an attack message or not is determined in light of patterns reflecting features of attack messages. As a result, determination of whether individual messages are attack messages is executed with higher precision.

Also, for example, in the identifying, a pattern relating to change in a data value included in the plurality of messages may be identified as the communication pattern. More specifically, the pattern relating to change in the data value may be a pattern relating to whether or not there is change in the data value included in a plurality of messages representing a data amount of the same type included in the partiality of messages, a pattern relating to amount of increase or decrease of a data amount included in the plurality of messages representing the data amount of the same type, or a pattern relating to difference or ratio between data values included in messages representing the data amount of the same type and data values included in messages representing a data amount of another type.

Accordingly, determination of whether or not individual messages are attack messages is performed in light of patterns relating to change in data values among messages or whether or not there are changes, and accordingly can be executed with higher precision.

Also, for example, in the identifying, a communication pattern relating to communication timing of the plurality of messages may be identified as the communication pattern. More specifically, the pattern relating to communication timing of the plurality of messages may be a pattern relating to intervals of transmission time of the plurality of messages representing a data amount of the same type included in the partiality of messages, or difference in transmission times among a plurality of messages representing the data amount of the same type or between messages representing data amounts of different types.

Accordingly, determination of whether or not individual messages are attack messages is performed in light of patterns relating to reception intervals among messages, and accordingly can be executed with higher precision.

Also, for example, the unauthorized communication detection method may further include calculating a prediction value of data value included in a message to be received next. In the identifying, the communication pattern may be identified by obtaining a model, obtained by executing statistical processing on information relating to the attack message, as the communication pattern, the calculating may be performed using the communication pattern, and in the executing communication pattern determination, whether or not the received message matches the communication pattern may be determined based on the results of comparison between the prediction value and the data value that the received message includes. More specifically, in the identifying, an autoregressive (AR) model, autoregressive-moving-average (ARMA) model, Hidden Markov Model (HMM), or Bayesian model may be obtained as the model.

Accordingly, data values predicted to be values that an attack message can assume are used for determination of whether or not individual messages are attack message, so the probability of successful detection is higher even for attacks that do not follow attack patterns that have actually occurred. Accordingly, the safety of the onboard network system can be protected in a surer manner.

Also, for example, in the saving, information relating to a gray message regarding which determination of whether an attack message or not could not be made in the executing unauthorized activity detection may be further stored in the at least one memory, and in the identifying, the communication pattern may be obtained by further executing the statistical processing on information relating to the gray message.

Accordingly, the determination of a message regarding which determination of whether or not an attack message is difficult is temporarily suspended, and determination can be made at a later time. The results of such determination made at a later time are used to strengthen communication patterns used in determination later, enabling execution of determination with higher precision.

Also, for example, the unauthorized communication detection method may further include recognizing whether or not an automatic driving function that a vehicle in which the onboard network system is installed has, for assisting or substituting at least part of driving actions of the vehicle by the driver, is being executed. The saving may be executed when recognition is made in the recognizing that the automatic driving function is not being executed, and the executing communication pattern determination may be executed when recognition is made in the recognizing that the automatic driving function is being executed.

Accordingly, this determination is performed when the vehicle is in a state where determination of whether an attack message or not is relatively easy, whereby strengthening of communication patterns can be efficiently performed, thereby promoting improvement in precision of determination.

Also, for example, the attack message may be sent out onto the network by one of the one or more electronic control units included in the onboard network system, with at least part of the executing unauthorized activity detection, the saving, the identifying, and the executing communication pattern determination being executed by an electronic control unit included on a different onboard network system from the electronic control unit sending out the attack message, or by a gateway that the onboard network system further includes.

Accordingly, when an ECU within the onboard network system is taken over by an attacker and sends out an attack message, for example, unauthorized communication is detected.

Also, for example, at least one of the one or more electronic control units included in the onboard network system may have a transmission data obtaining unit that obtains data transmitted from outside of the onboard network system, the electronic control unit having the transmission data obtaining unit executing at least the executing unauthorized activity detection regarding a message included in data transmitted from outside of the onboard network system.

This enables intrusion into the onboard network system, by an attack message attempting to be externally sent in, to be suppressed.

Also, an unauthorized activity detection system according to an aspect of the present disclosure is unauthorized communication detection system to detect unauthorized control in an onboard network system. The onboard network system includes a network and one or more electronic control units connected to the network. The unauthorized communication detection system includes at least one processor, and one or more memories including at least one sent of instruction that, when executed by the at least one processor, causes the at least one processor to perform operations including executing unauthorized activity detection of determining whether or not a message sent out onto the network is an attack message, saving information relating to the attack message in at least one memory in a case where the message is an attack message, identifying a communication pattern occurring on the onboard network, from information relating to the attack message, and executing communication pattern determination to determine whether or not the message matches a communication pattern that has been identified. At least the unauthorized activity detection and the communication pattern determining are executed on each of a plurality of messages that have been successively sent out onto the network, and in the unauthorized activity detection executed on a message sent out after executing of the communication pattern determination, determination results of this communication pattern determination that has already been executed are used for determining whether or not this message is an attack message.

Accordingly, whether a message sent out onto the onboard network system is an attack message or not is determined in light of patterns reflecting features of attack messages. As a result, determination of whether individual messages are attack messages is executed with higher precision.

Also, according to an aspect of the present disclosure, a non-transitory computer-readable recording medium stores a program causing an unauthorized communication detection system to detect unauthorized communication in an onboard network system. The unauthorized communication detection system includes at least one processor and at least one memory. The onboard network system includes a network and one or more electronic control units connected to the network. When executed by the at least one processor, the program causes the at least one processor to perform operations including executing unauthorized activity detection of determining whether or not a message sent out onto the network is an attack message, saving information relating to the attack message in the at least one memory in a case where the message is an attack message, identifying a communication pattern occurring on the onboard network, from information relating to the attack message, and executing communication pattern determination to determine whether or not the message matches a communication pattern that has been identified. At least the unauthorized activity detection and the communication pattern determining are executed on each of a plurality of messages that have been successively sent out onto the network. In the unauthorized activity detection executed on a message sent out after executing of the communication pattern determination, determination results of this communication pattern determination that has already been executed are used for determining whether or not this message is an attack message.

Accordingly, whether a message sent out onto the onboard network system is an attack message or not is determined in light of patterns reflecting features of attack messages. As a result, determination of whether individual messages are attack messages is executed with higher precision.

Embodiments will be described below in detail with reference to the drawings. Note that the embodiments described below are all comprehensive or specific examples of the present disclosure. Accordingly, values, shapes materials, components, placements and connected states of components, steps, the order of steps, and so forth, illustrated in the following embodiments, are only exemplary, and do not restrict the present disclosure. Components in the following embodiments which are not included in an independent Claim are described as being optionally includable components.

First Embodiment

1. Overview

A first embodiment will be described with reference to the drawings, by way of an example of an onboard network system where determination is made regarding whether a message being transmitted is an attack message or not.

1.1 Overall Configuration of Onboard Network System

FIG. 1 is a block diagram illustrating the overall configuration of an onboard network system 10. The onboard network system 10 is configured of a CAN network, and includes ECUs 100 (ECU 100a, ECU 100b, ECU 100c, and ECU 100d in the drawings, also collectively or an unspecified part thereof being referred to as ECU 100 hereinafter), a bus 200 (bus 200a and 200b in the drawings, also collectively or an unspecified one thereof being referred to as bus 200), and a gateway 300.

The ECU 100a is connected to an engine 101, the ECU 100b to brakes 102, the ECU 100c to a door open/close sensor 103, and the ECU 100d to a window open/close sensor 104, respectively. The ECUs 100 obtains states of devices to which they are respectively connected, and periodically output the obtained states to the bus 200. For example, the ECU 100a obtains revolutions which is a state of the engine 101, and attaches a predetermined ID to a message including a data value representing the revolutions, and sends this out onto the bus 200. The ECUs 100 read out messages transmitted by other ECUs 100 from the bus 200, and selectively receive in accordance with IDs attached to the messages. This selective reception will be described later.

The gateway 300 is connected to the bus 200a to which the ECU 100a and ECU 100b are connected, and to the bus 200b to which the ECU 100c and ECU 100d are connected. The gateway 300 has a function of transferring a message received from one bus to the other bus. The gateway 300 also is a node on the CAN network.

Note that the onboard network system 10 is an example for describing an object to which an unauthorized activity detection system and so forth that determines whether or not a message is an attack message is applicable, and that the object of application thereof is not restricted to the onboard network system 10.

1.2 Data Format of Messages

Figure 2:
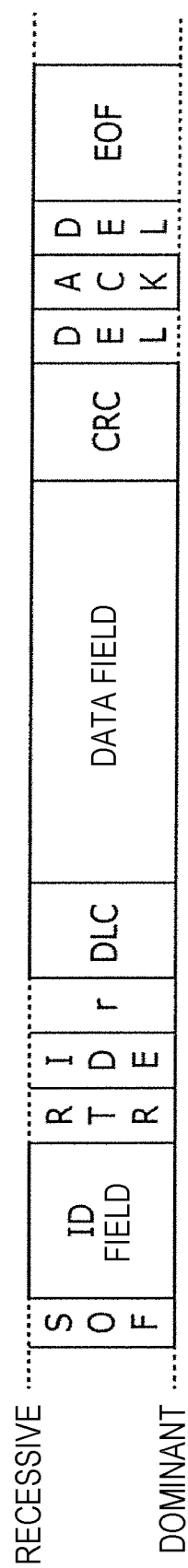
FIG. 2 is a diagram illustrating a data frame format in the CAN protocol.

FIG. 2 is a diagram illustrating a format of a CAN protocol message. A message according to a standard ID format in the CAN protocol is shown here. The message is made up of a Start OF Frame (also referred to as SOF in the drawing and hereinafter), an ID field, a Remote Transmission Request (also referred to as RTR in the drawing and hereinafter), an IDentifier Extension (also referred to as IDE in the drawing and hereinafter), a reserved bit (also referred to as r in the drawing and hereinafter), a data length code (also referred to as DLC in the drawing and hereinafter), a data field, a Cyclic Redundancy Check (also referred to as CRC in the drawing and hereinafter) sequence, a CRC delimiter (DEL to the left in the drawing), an Acknowledgement (also referred to as ACK in the drawing and hereinafter) slot, an ACK delimiter (DEL to the right in the drawing), and an end of frame (also referred to as EOF in the drawing and hereinafter).

The SOF is 1-bit dominant. Dominant means the state where voltage is applied to two cables making up a bus in a CAN network using a digital format for transmission of data to transmit the value "0", and the value "0" that is transmitted. In comparison with this, recessive means the state where voltage is applied to two cables making up a bus to transmit the value "1", and the value "1" that is transmitted. In a case where a value of "0" and a value of "1" are transmitted from two nodes to a bus at the same time, the value of "0" is given priority. The bus is recessive when idle. The ECUs 100 start transmission of a message by changing the state of the bus 200 from recessive to dominant, and the other ECUs 100 read this change and synchronize. The portions indicated by solid lines in FIG. 2 representing dominant and recessive making up the message, can assume the values of dominant and recessive. The SOF is dominant fixed, so the dominant line is solid, and the recessive line is dotted.

The ID is an 11-bit value indicating the type of data that the message includes. CAN is designed such that during communication arbitration among messages where multiple nodes have started transmission at the same time, messages with smaller ID values have higher priority.

The RTR is a 1-bit dominant indicating that the frame is a message (data frame). IDE and r each are 1-bit dominant. DLC is a 4-bit value indicating the length of the subsequent data field.

The data field is a value indicating the content of the data transmitted, having a maximum length of 64 bits, and the length can be adjusted in 8-bit increments. Specifications regarding allocation of transmitted data to this portion is dependent on vehicle type and manufacturer.

The CRC sequence is a 15-bit value calculated from the transmission values of the SOF, ID field, control field, and data field. The CRC delimiter is a 1-bit recessive fixed sectioning symbol representing the end of the CRC sequence. The reception node compares the results of calculation from the SOF of the received message, ID field, control field, and data field, with this CRC sequence value, thereby judging whether or not there is an abnormality.

The ACK slot is 1-bit long, and the transmitting node transmits recessive at this portion. If the receiving node has been able to successfully receive up to the CRC sequence, the receiving node returns dominant as a confirmation response. Dominant is given priority, so if communication of one message has been successfully performed up to the CRC sequence, the bus 200 during transmission of the ACK slot is dominant. The ACK delimiter is a 1-bit recessive fixed sectioning symbol representing the end of the ACK slot. The EOF is 7-bit recessive fixed, indicating the end of the message.

1.3 Configuration of Gateway

FIG. 3 is a diagram illustrating the configuration of the gateway 300 included in the onboard network system 10. The gateway 300 includes a frame transmission/reception unit 310, a frame interpreting unit 320, a reception ID determining unit 330, a reception ID list storing unit 340, a frame processing unit 350, a transfer rule storing unit 360, an unauthorized activity detection processing function group 370, and a frame generating unit 380.

Note that these components are functional components, and that the gateway 300 is provided as an information processing device having a processing unit realized by a processor, a memory realized by semiconductor memory or the like, and input/output unit realized by an input/output port, and so forth, for example. The functional components listed above are realized by reading out and executing of programs stored in the memory by the processing unit, storing of predetermined data by the storing unit, and transmission/reception of data via the input/output unit, and combinations thereof.

The frame transmission/reception unit 310 transmits and receives messages following the CAN protocol to and from each of the busses 200a and 200b. More specifically, the frame transmission/reception unit 310 reads out messages sent out onto the bus 200 one bit at a time, and transfers the read messages to the frame interpreting unit 320. The frame transmission/reception unit 310 also sends out messages one bit at a time to the busses 200a and 200b, in accordance with bus information notified from the frame generating unit 380. Transfer of messages among the busses 200 is executed by transmitting messages received from the bus 200a to the bus 200b, and transmitting messages received from the bus 200b to the bus 200a.

The frame interpreting unit 320 receives values of a message from the frame transmission/reception unit 310, and interprets a frame (message) by mapping to the fields of the CAN protocol. The frame interpreting unit 320 transfers a series of values judged to be values of the ID field in this interpreting to the reception ID determining unit 330.

The frame interpreting unit 320 further decides, in accordance with determination results notified from the reception ID determining unit 330 whether to transfer the value of the ID field of the message and the data field appearing following the ID field to the frame processing unit 350, or to cancel reception of the message.

In a case having judged that a message does not follow the CAN protocol, the frame interpreting unit 320 requests the frame generating unit 380 to transmit an error frame. An error frame is a frame of a predetermined format stipulated by the CAN protocol, that differs from the above-described message, and is transmitted from a node in a case of an error occurring on the CAN network. Upon an error flag being sent out onto the bus, immediate transmission of messages on that network is interrupted. In a case of having judged that an error frame transmitted by another node has been received, the frame interpreting unit 320 discards the message being read.

The reception ID determining unit 330 receives the value of the ID field from frame interpreting unit 320, and performs determination of whether or not to receive the message that has been read out, following the list of message IDs that the reception ID list storing unit 340 stores. The reception ID determining unit 330 notifies the frame interpreting unit 320 of the results of this determination.

The reception ID list storing unit 340 stores a list of message IDs that the gateway 300 receives (hereinafter, also referred to as reception ID list). FIG. 4 is a diagram illustrating an example of the data configuration of a reception ID list. Details of the reception ID list will be described later using this example.

The frame processing unit 350 decides the bus that is the destination of transfer in accordance with the ID of the received message, following transfer rules that the transfer rule storing unit 360 stores, and hands to the frame generating unit 380 the bus that is the destination of transfer, the message ID notified from the frame interpreting unit 320, and the data to be transferred.

The frame processing unit 350 also, sends the message received from the frame interpreting unit 320 to the unauthorized activity detection processing function group 370, and requests determination of whether that message is an attack message or not. The frame processing unit 350 does not transfer a message regarding which determination has been made at the unauthorized activity detection processing function group 370 to be an attack message.

The transfer rule storing unit 360 stores rules relating to data transfer for each bus (hereinafter also referred to as transfer rules). FIG. 5 is a diagram illustrating an example of the data configuration of transfer rules. Details of transfer rules will be described later using this example.

The unauthorized activity detection processing function group 370 is a function group that determines whether a message being received is an attack message. The details of the functional configuration included in the unauthorized activity detection processing function group 370 will be described later.

The frame generating unit 380 configures an error frame following a request from the frame interpreting unit 320 to transmit an error frame, and sends it out to the frame transmission/reception unit 310.

The frame generating unit 380 also configures a message frame using the message ID and data received from the frame processing unit 350 and sends this to the frame transmission/reception unit 310 along with the bus information.

1.4 Reception ID List

FIG. 4 is a diagram illustrating an example of the data configuration of a reception ID list that is a list of message IDs that the gateway 300 receives. In this example, IDs of messages that are the object of the gateway 300 to receive from the bus 200 and process are included in each row. In the settings of the reception ID list in this example, message having message IDs of "1", "2", "3", and "4" are received by the gateway 300. Reception of messages having an ID not included in the reception ID list is cancelled. Note that the values of IDs and the number of IDs included in the list in this example are exemplary for the sake of description, and that this does not restrict the configuration of the reception ID list used by the gateway 300.

1.5 Transfer Rules

FIG. 5 illustrates an example of the data configuration of transfer rules stored at the gateway 300. In this example, the combination of transfer source bus and transfer destination bus of the message (indicated by names 200a and 200b the same as the reference numerals), and the ID of the message to be transferred, are included in each row. In the settings according to the transfer rules in this example, the gateway 300 transfers messages received from the bus 200a to the bus 200b, regardless of what the ID is. Also, message received from the bus 200b are transferred to the bus 200a only regarding messages of which the ID is "3".

1.6 Configuration of Unauthorized Activity Detection Processing Function Group

Figure 6:
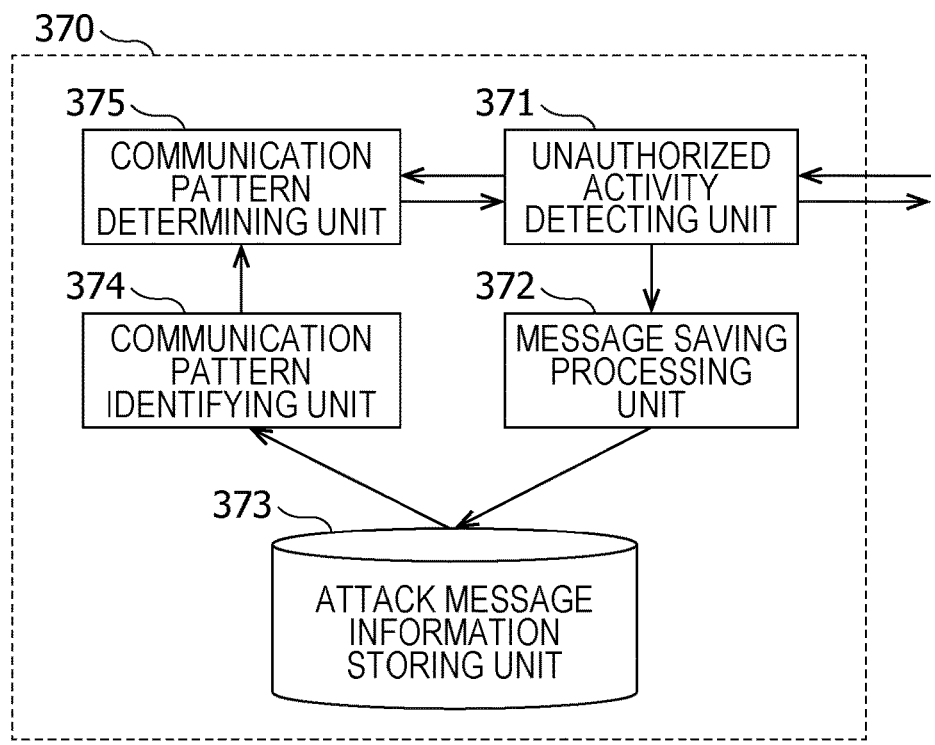
FIG. 6 is a block diagram illustrating an example of the functional configuration of an unauthorized activity detection processing function group in the first embodiment.

FIG. 6 is a block diagram illustrating the functional configuration of the unauthorized activity detection processing function group 370 that the gateway 300 has. The unauthorized activity detection processing function group 370 includes an unauthorized activity detecting unit 371, a message saving processing unit 372, an attack message information storing unit 373, a communication pattern identifying unit 374, and a communication pattern determining unit 375.

Note that these functional components also are realized by reading out and executing of programs stored in the memory by the processing unit, storing of predetermined data by the storing unit, and transmission/reception of data via the input/output unit, and combinations thereof.

The unauthorized activity detecting unit 371 determines whether or not a message received from the frame processing unit 350 is an attack message. The unauthorized activity detecting unit 371 has multiple types of determining functions. The determining functions reference different rules (omitted from illustration) set beforehand and stored in a memory, and determine whether received messages are checked using these rules, i.e., whether the messages match these rules. Whether or not the received message is an attack message is determined based on the determination results of the determining functions. If the received message is an attack message, the unauthorized activity detecting unit 371 detects occurrence of unauthorized activity.

Figure 7:
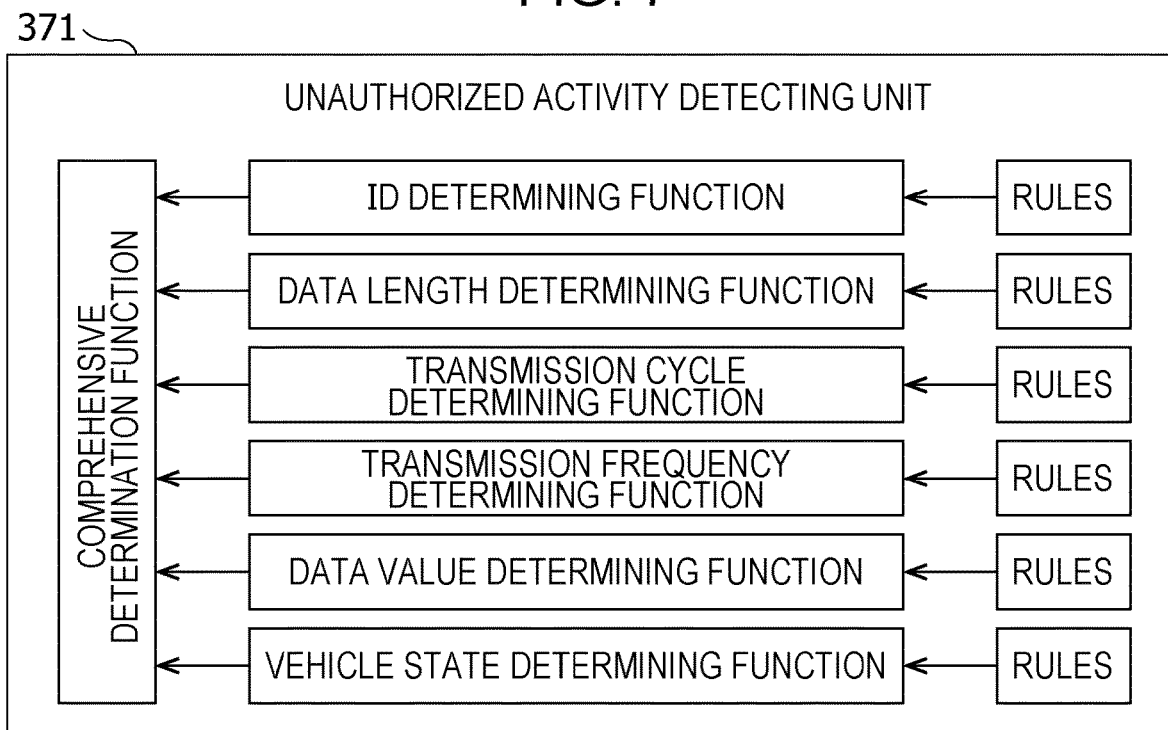
FIG. 7 is a block diagram illustrating the functional configuration of an unauthorized activity detection unit according to the first embodiment.

FIG. 7 illustrates the configuration of the unauthorized activity detecting unit 371. FIG. 7 is a block diagram illustrating an example of the functional configuration of the unauthorized activity detecting unit 371. In this example, the unauthorized activity detecting unit 371 has six types of determining functions for checking predetermined points of a message. Specifically, these are a function of checking the ID field of a message (ID determining function), a function of checking data length of the message (data length determining function), a function of checking a cycle (time interval) of message transmission (transmission cycle determining function), a function of checking the frequency of the message being transmitted (transmission frequency determining function), a function of checking the value of the data field (data value) of the message (data value determining function), and a function of recognizing the state of the vehicle based on the determination results of these determining functions, transmission cycle, frequency, data values, amounts of change in data values, and so forth, and checking the state of the vehicle (vehicle state determining function). The unauthorized activity detecting unit 371 further has a comprehensive determination function of comprehensively determining whether or not the received message is an attack message from the determination results of these determining functions. The results of the comprehensive determination function are the results of detection of unauthorized activity by the unauthorized activity detecting unit 371.

Note that the functional components that the gateway 300 has also are realized by reading out and executing of programs stored in the memory by the processing unit, storing of predetermined data by the storing unit, and transmission/reception of data via the input/output unit, and combinations thereof, at the gateway 300.

Returning to the description in FIG. 6, the unauthorized activity detecting unit 371 requests the communication pattern determining unit 375 for determination of whether or not the received message matches the communication pattern of an attack message.

In a case of determining, in response to the determination results of the unauthorized activity detecting unit 371, that the received message is an attack message and also needs to be saved, the message saving processing unit 372 stores in the attack message information storing unit 373 the received attack message, the time of reception of the attack message, difference in reception time as to another message having the same ID or a particular different ID, and information relating to the attack message such as amount of change in data values and so forth.

The attack message information storing unit 373 stores the information relating to the attack message, regarding which it has been instructed to store by the message saving processing unit 372. Specifically, this is stored in a memory that the gateway 300 has. The attack message information storing unit 373 also outputs information relating to attack messages stored therein, in response to a request from the communication pattern identifying unit 374.

The communication pattern identifying unit 374 obtains information relating to attack messages from the attack message information storing unit 373, and identifies patterns seen in attack messages that have been received (hereinafter, communication pattern).

A communication pattern is a pattern relating to change in data values, for example. More specific examples include a pattern relating to whether or not there is change in the same ID, i.e., values in a data field representing the same type of data value (both cases of entirely and cases of values of particular portions), amount of increase or decrease, pattern relating to proportion or frequency, and pattern relating to difference or ratio as to data values of message of another particular ID.

Also, for example, a communication pattern is a pattern relating to communication timing of an attack message, and examples include a pattern relating to irregularity in intervals between actual transmission times of multiple messages of the same ID, and a pattern relating to difference in transmission time among messages of a certain ID, or between a message of a certain ID and another particular ID. As a more specific example, a pattern where an attack message is transmitted immediately before or immediately after a legitimate message, or a pattern where a legitimate message and an attack message are transmitted with a certain amount of time therebetween, may be identified.

The communication pattern identifying unit 374 obtains information relating to attack messages from the attack message information storing unit 373 in order to identify such communication patterns. Information relating to attack messages is information used to identify the above-described communication patterns, such as data values, reception times, and so forth, of individual attack messages.

The communication pattern identifying unit 374 derives and identifies communication patterns such as described above, through comparison and statistical processing and the like of the obtained information. The amount of information relating to attack messages used for identification may be decided taking into consideration the load and precision of the identification processing, for example.

Also, after having identified the communication pattern, the communication pattern identifying unit 374 notifies the communication pattern determining unit 375 of information indicating the communication pattern obtained as the result of identification, and information necessary for determining that communication pattern. Information necessary for determining a communication pattern is, for example, if the pattern is that the value of a particular portion of the data field is a constant value, that portion and value, if the pattern is that change (increase or decrease) of data values is seen at a constant rate, that rate, and if the pattern is that the data value is a constant difference as to the data value of a message of another particular ID, that constant difference.

Such communication pattern identification by the communication pattern identifying unit 374 can be executed at various types of timings. For example, the timing may be related to addition of information relating to an attack message. More specifically, this may be executed each time information relating to an attack message is newly saved in the attack message information storing unit 373, or may be executed when information relating to attack messages saved in the attack message information storing unit 373 reach a constant amount (volume or count). Also, this may be a timing not related to addition of information relating to attack messages. For example, this may be executed each time a predetermined amount of time elapses, or may be when the vehicle is in a predetermined state or when the state of the vehicle exhibits a predetermined change. Also, this may be when conditions combining such states are satisfied. The timing for executing identification may be decided taking into consideration the load of processing for identification, and the necessity to add or update communication patterns, for example.

The communication pattern determining unit 375 determines whether or not the received message matches the communication pattern obtained as a result of identification by the communication pattern identifying unit 374, in response to the request from the unauthorized activity detecting unit 371. For determination regarding matching of the received message to a communication pattern, the communication pattern determining unit 375 uses, besides the received message that is the object for the determining, an older received message, information indicating an identified communication pattern notified from the communication pattern identifying unit 374, information necessary for other determination of communication pattern, and so forth, for example.

For example, determination of matching with a communication pattern where a value at a particular portion of the data field is a constant value is performed based on whether or not the value of the data field in the received message matches the portion notified from the communication pattern identifying unit 374 and the value at that portion.

Also for example, matching with a pattern where a data value is increasing or decreasing at a constant rate or amount is performed by calculating the difference or ratio between the data value of a message received one back, and the data value of the message that is the object of determination, and performing determination based on whether or not the results of calculation are consistent with the rate or amount of change notified from the communication pattern identifying unit 374.

Also for example, matching with a pattern where a data value is a constant difference or ratio as to a data value of a message of another particular ID is performed by calculating the difference or ratio between the data value in the received message and the data value of the message of another particular ID received at a corresponding cycle and performing determination based on whether or not the results of calculation match the difference or ratio notified from the communication pattern identifying unit 374.

Also for example, matching with a pattern where an attack message is transmitted immediately before or immediately after another message, or a pattern of being transmitted after a certain amount of time has elapsed, is performed based on whether or not the difference between the time of transmission of the other message and the time of transmission of the received message that is the object of determination is within the predetermined range. Note that the other message may be a previous or following message of the same ID, or may be a message with another particular ID.

Figure 8:
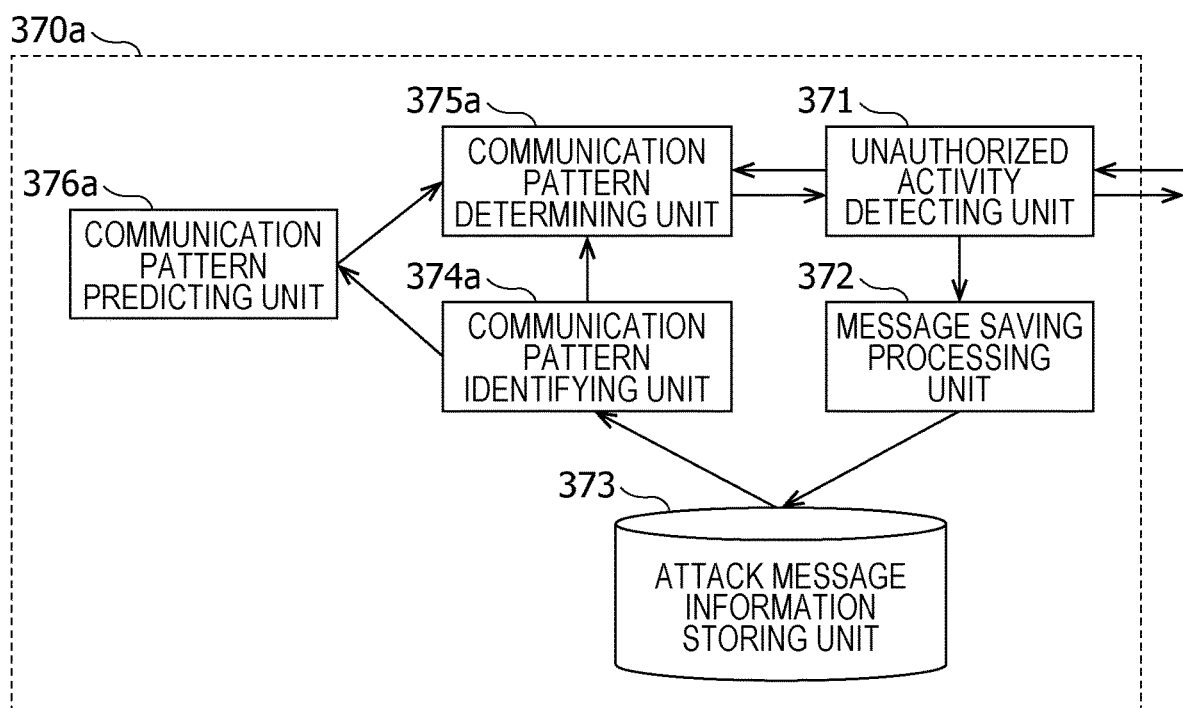
FIG. 8 is a block diagram illustrating another example of the functional configuration of an unauthorized activity detection processing function group in the first embodiment.

Although the communication pattern identifying unit 374 identifies the communication pattern regarding the change in value of the data field or the communication timing, and the communication pattern determining unit 375 determines whether or not the received message matches this communication pattern, but the configuration of the unauthorized activity detection processing function group that the gateway 300 has is not restricted to this. The gateway 300 may have an unauthorized activity detection processing function group 370a further including a communication pattern predicting unit 376a as illustrated in FIG. 8 for example, instead of the unauthorized activity detection processing function group 370. FIG. 8 is a block diagram illustrating another example of the function configuration of the unauthorized activity detection processing function group according to the present embodiment. Functional components of the unauthorized activity detection processing function group 370a that are in common with those in the unauthorized activity detection processing function group 370 are denoted by common reference numerals, and detailed description thereof will be omitted.

In FIG. 8, a communication pattern identifying unit 374a uses statistical processing or probability theory to obtain a model of information regarding the attack message, such as an AR model, ARMA model, HMM, or Bayesian model or the like, and takes that model as a communication pattern. The communication pattern predicting unit 376a uses the model identified by the communication pattern identifying unit 374a as a communication pattern, and calculates a prediction value relating to the data value or communication timing of a message to be received.

A communication pattern determining unit 375a determines whether or not this received message matches the communication pattern from prediction values calculated by the communication pattern predicting unit 376a, and information relating to the received message. Note that the communication pattern determining unit 375 and communication pattern determining unit 375a have been described so far regarding determining whether or not a communication pattern is matched. This term "match" is not restricted to the meaning of matching only being agreement in data values or times being compared. For example, the term "match" is used in the present disclosure intending the meaning of being determined to be matching when within a predetermined error margin.

For example, matching with a communication pattern where the value of a particular portion of the data field is constant may be determined based on whether or not within a margin designed from that value beforehand, and not whether or not that constant value is agreed with.

Also, for example, matching with a communication pattern where the data value increases at a constant rate may be determined based on whether or not within a margin designed beforehand from the value of the results of having increased at that contrast rate. In the same way, matching with a communication pattern where the data value decreases at a constant rate may be determined based on whether or not within a margin designed beforehand from the value of the results of having decreased at that contrast rate.

Also, for example, matching with a communication pattern which is a value where a certain value has been added to the data value of a message of another ID may be determined based on whether within a margin designed beforehand from the value of the results of having added a certain ID to the data value of the message of another ID. In the same way, matching with a communication pattern which is a value where a certain value has been subtracted from the data value of a message of another ID may be determined based on whether or not within a margin designed beforehand from the value of the results of having subtracted a certain value from the data value of the message of another ID.

Also, for example, matching with a communication pattern where the attack message is transmitted immediately prior to transmission of another message may be determined based on whether or not within a margin designed beforehand from a point in time immediately before that has been defined beforehand. In the same way, matching with a communication pattern where the attack message is transmitted immediately after transmission of another message may be determined based on whether not within a margin designed beforehand from a point in time immediately after that has been defined beforehand. Matching with a communication pattern where the attack message is transmitted after a certain amount of time has elapsed after transmission of another message may be determined based on whether not within a margin designed beforehand from a point in time where a certain amount of time has elapsed from transmission of the other message.

Further, in a case where a data value is predicted by the communication pattern predicting unit 376a, whether or not a communication pattern is matched may be determined based on whether not the data value of the received message is within a margin designed beforehand from the predicted value. Also, in a case where a communication timing is predicted by the communication pattern predicting unit 376a, whether or not a communication pattern is matched may be determined based on whether not transmission or reception time of a received message, or difference as to transmission or reception time of another message, is at or below a threshold value set beforehand.

Although the message saving processing unit 372 has been described as saving information relating to an attack message in a case where a received message is an attack message and saving is determined to be necessary, this is not restrictive. In a case where information relating to a normal message is also necessary for identification by the communication pattern identifying unit 374 or communication pattern identifying unit 374a, the message saving processing unit 372 may also save information relating to a normal message as well. In this case, the determination results by the unauthorized activity detecting unit 371 regarding each message, for example, may also be saved together, as information relation to each message.

Received messages are saved in the memory of the gateway 300. However, the capacity of the memory is finite, so with regard to necessity of saving messages, in a case where an identification method is used that is capable of identifying communication patterns even based on information decimated attack messages for example, whether or not saving of individual attack messages is determined so that the count of messages being saved is unnecessarily great. Also, message saving management may be performed by a first-in first-out method, where the upper limit of the count or capacity of messages stored in the memory is set beforehand, and each time a message that is the object of saving occurs, an old message is deleted.

1.7 Configuration of ECUs

Figure 9:
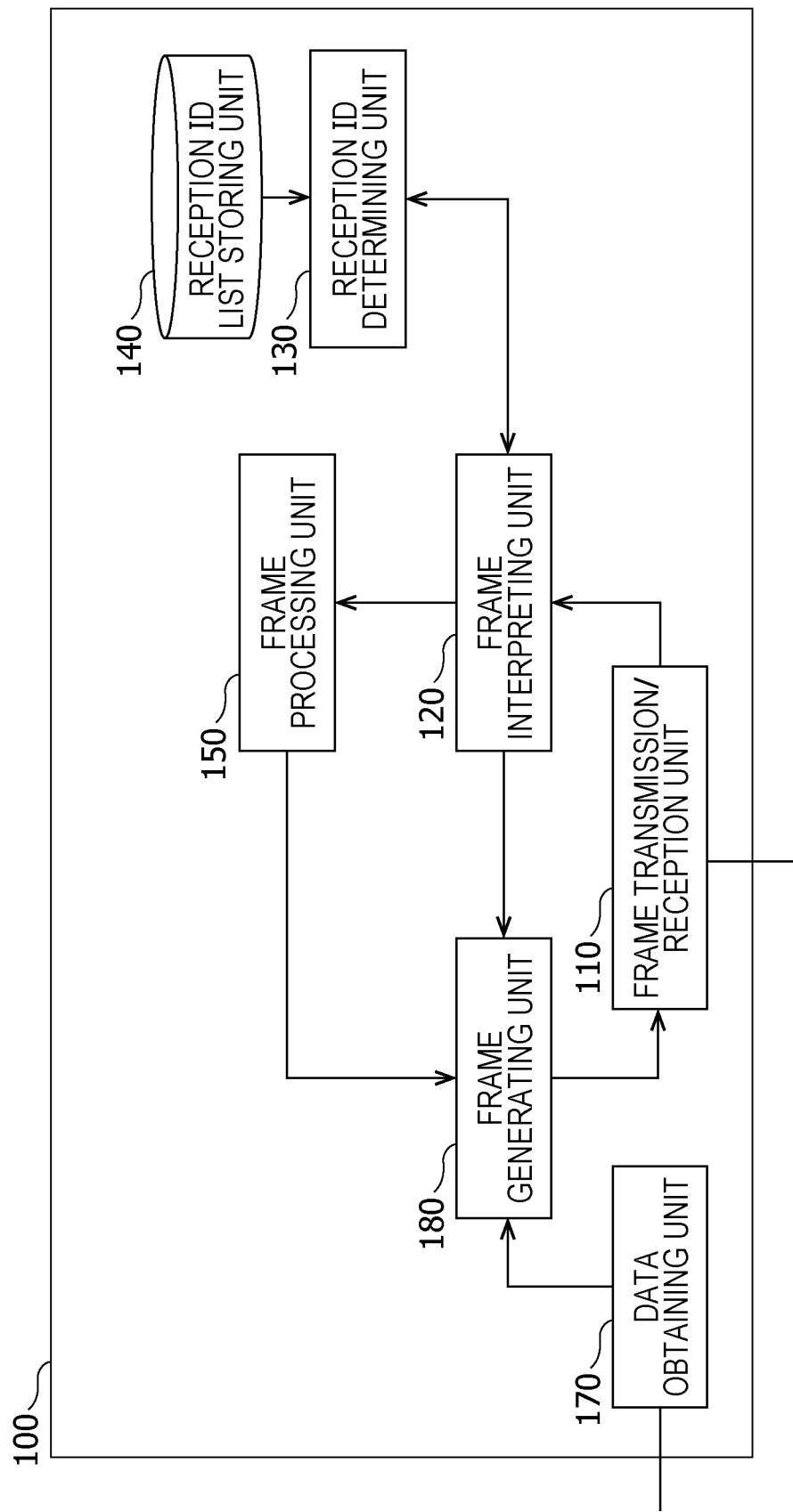
FIG. 9 is a block diagram illustrating an example of the functional configuration of an ECU included in the aforementioned onboard network system according to the first embodiment.

FIG. 9 is a block diagram illustrating the function configuration of the ECUs 100 included in the onboard network system 10. Each ECU 100 includes a frame transmission/reception unit 110, a frame interpreting unit 120, a reception ID determining unit 130, a reception ID list storing unit 140, a frame processing unit 150, a data obtaining unit 170, and a frame generating unit 180.

Note that these components are functional components, and that the ECU 100 is provided as an information processing device having a processing unit realized by a processor, a memory realized by semiconductor memory or the like, and input/output unit realized by an input/output port, and so forth, for example. The functional components listed above are realized by reading out and executing of programs stored in the memory by the processing unit, storing of predetermined data by the storing unit, and transmission/reception of data via the input/output unit, and combinations thereof.

The frame transmission/reception unit 110 transmits and receives messages to and from the bus 200 following the CAN protocol. More specifically, the frame transmission/reception unit 110 reads out messages sent out onto the bus 200 one bit at a time, and transfers the messages that have been read out to the frame interpreting unit 120. The frame transmission/reception unit 110 sends out messages regarding which notification has been received from the frame generating unit 180 to the bus 200.

The frame interpreting unit 120 receives the values of a message from the frame transmission/reception unit 110, and interprets the frame (message) by mapping to the fields of the CAN protocol. The frame interpreting unit 120 transfers a series of values judged to be the ID field in this interpreting to the reception ID determining unit 130.

The frame interpreting unit 120 further decides, in accordance with determination results notified from the reception ID determining unit 130 whether to transfer the value of the ID field of the message and the data field appearing following the ID field to the frame processing unit 150, or to cancel reception of the message. In a case having judged that a message does not follow the CAN protocol, the frame interpreting unit 120 requests the frame generating unit 180 to transmit an error frame. In a case of having judged that an error frame transmitted by another node has been received, the frame interpreting unit 120 discards the message being read.

The reception ID determining unit 130 receives the value of the ID field from frame interpreting unit 120, and performs determination of whether or not to receive the message that has been read out, following the list of message IDs that the reception ID list storing unit 140 stores. The reception ID determining unit 130 notifies the frame interpreting unit 120 of the results of this determination.

The reception ID list storing unit 140 stores a reception ID list that is a list of message IDs that the ECU 100 receives. The reception ID list is the same as that in FIG. 4, so description will be omitted here.

The frame processing unit 150 performs processing in accordance with the data of the received message. The contents of processing differ depending on the ECU 100. For example, upon receiving a message indicating that a door is open when the speed is exceeding 30 km, the ECU 100a executes processing to sound an alarm sound. Upon a door opening when a message is being received indicating that the brakes are not applied, the ECU 100c executes processing to sound an alarm sound. These processing are listed here exemplarily for the sake of description, and the ECUs 100 may execute processing other than those described above. The frame processing unit 150 causes the frame generating unit 180 to generate frames to be sent out for executing such processing.

The data obtaining unit 170 obtains output data indicating the state of devices and measurement values from sensors and so forth connected to the ECUs 100, which is transferred to the frame generating unit 180.

The frame generating unit 180 configures an error frame in accordance with a request for an error frame that has been notified from the frame interpreting unit 120, and transmits to the frame transmission/reception unit 110. The frame generating unit 180 also configures a message frame by attaching a message ID that has been decided beforehand to values of data received from the data obtaining unit 170, and transmits to the frame transmission/reception unit 110.

1.8 Unauthorized Activity Detection Processing

Figure 10:
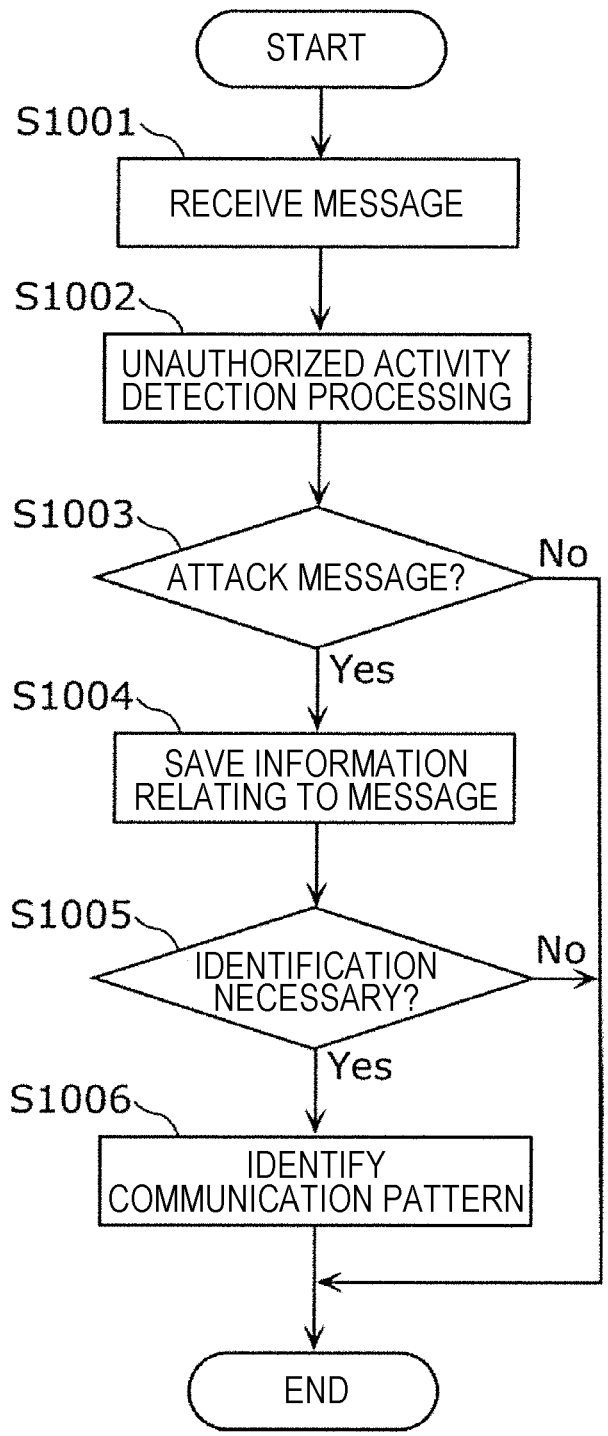
FIG. 10 is a flowchart illustrating an example of unauthorized activity detection processing according to the first embodiment.

FIG. 10 is a flowchart illustrating an example of unauthorized activity detection processing at the unauthorized activity detection processing function group 370.

First, the unauthorized activity detecting unit 371 receives a message form the frame processing unit 350 (step S1001).

The unauthorized activity detecting unit 371 that has received the message uses various types of determining functions, such as ID determining function and so forth, to determine whether that message is an attack message or a normal message. The unauthorized activity detecting unit 371 notifies the message saving processing unit 372 of the results of the determining. At this time, the unauthorized activity detecting unit 371 further commissions the communication pattern determining unit 375 to determine whether or not the received message matches a communication pattern of an attack message. The comprehensive determining function of the unauthorized activity detecting unit 371 makes a final comprehensive determination regarding this message, based on the results of determination by the various types of determining functions such as ID determining function, and the results of determination by the communication pattern determining unit 375 (step S1002).

In a case of the message saving processing unit 372 having received a notification that the received message is an attack message, as the final determination results from the unauthorized activity detecting unit 371 (Yes in step S1003), the flow advances to step S1004. In a case where the notification that the message saving processing unit 372 has received is a notification that the received message is not an attack message, the unauthorized activity detection processing at the unauthorized activity detection processing function group 370 ends (No in step S1003).

In a case of Yes in step S1003, the message saving processing unit 372 causes the attack message information storing unit 373 to save information relating to the attack message (step S1004).

After information relating to the attack message has been saved in the attack message information storing unit 373, the communication pattern identifying unit 374 determines whether or not conditions for executing identification of communication pattern have been satisfied (step S1005). Determination of whether or not identification is necessary is executed based on whether or not the count of attack messages stored is of a level where communication patterns can be identified.

In a case where the communication pattern identifying unit 374 determines in step S1005 that communication pattern identification is necessary (Yes in step S1005), the communication pattern identifying unit 374 identifies an attack pattern from information relating to attack messages stored in the attack message information storing unit 373 (step S1006).

In a case of the communication pattern identifying unit 374 determining in step S1005 that communication pattern identification is not necessary (No in step S1005), the unauthorized activity detection processing at the unauthorized activity detection processing function group 370 ends.

The identified communication pattern is stored in the memory of the gateway 300, and is referenced by the communication pattern determining unit 375 or communication pattern determining unit 375a for determination of received messages. The results of this determination are used in the comprehensive determining function in the unauthorized activity detection processing (step S1002). Accordingly, determination of whether or not individual messages are attack messages is executed with higher precision.

Note that out of the above-described unauthorized activity detection processing at the unauthorized activity detection processing function group 370, the step of unauthorized activity detection by the unauthorized activity detecting unit 371, and the step of communication pattern matching determination at the communication pattern determining unit 375 or communication pattern determining unit 375a, are executed on each reception message, but other steps are executed in a case where predetermined conditions are satisfied in step S1003 or step S1005, and accordingly are not necessarily executed on each reception message.

The unauthorized activity detecting unit 371 also has been described as executing final determination regarding whether or not the received message is an attack message, comprehensively from the determination results of the various types of determining functions such as ID determining function and so forth, and the determination results from the communication pattern determining unit 375, but this is not restrictive. For example, determination may be temporarily made from the determination results of the various types of determining functions, determination be made by the communication pattern determining unit 375 in accordance with the determination results thereof, and thereafter final determination be made. Conversely, determination by the communication pattern determining unit 375 may be made first, and determination by various types of determining function such as ID determining function be performed in accordance with the result thereof.

Also, the determination to be executed may be decided for each message received. Accordingly, depending on the received messages, messages regarding which determination by the various types of determining functions such as ID determining function at the unauthorized activity detecting unit 371 is sufficient, for example, can be kept from determination by the communication pattern determining unit 375 being performed, regardless of the results. Messages which only need determination by the communication pattern determining unit 375 can be kept from determination being performed by the various determining functions of the unauthorized activity detecting unit 371 regardless of the results thereof.

Accordingly, determination processing by the various types of determining functions or by the communication pattern determining unit 375 can be omitted in accordance with determination results of the message that has been received, so advantages of higher speed and reduced electricity consumption can be expected for the determining processing of the overall unauthorized activity detection processing function group 370.

1.9 Transfer Processing

Figure 11:
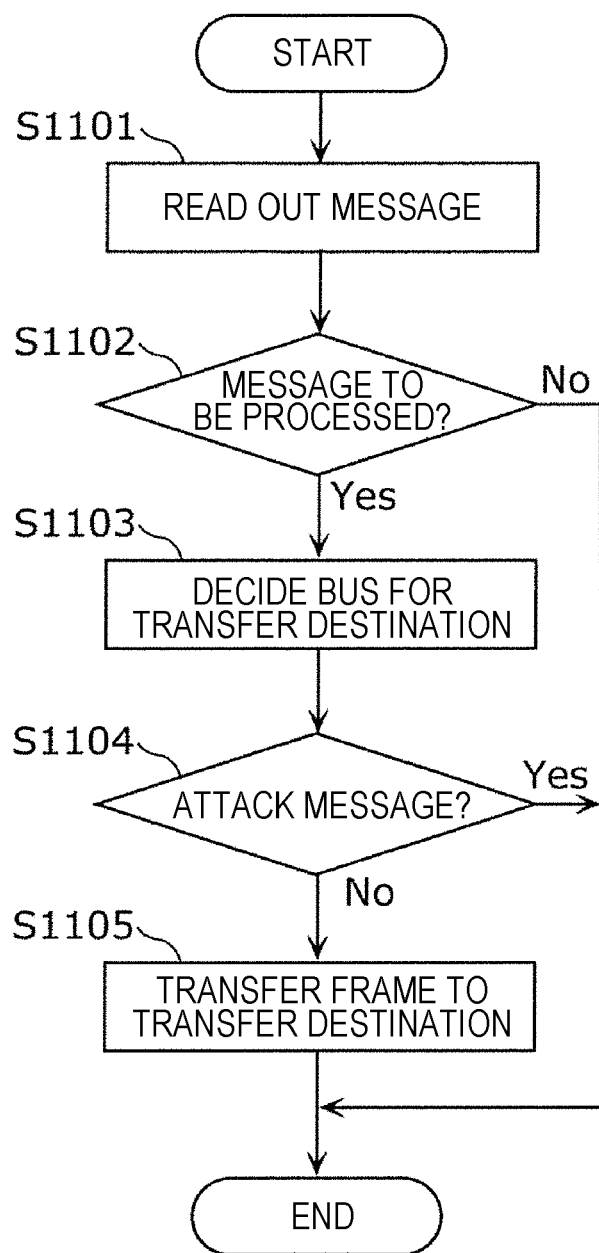
FIG. 11 is a flowchart illustrating an example of transfer processing according to the first embodiment.

FIG. 11 is a diagram illustrating a flowchart illustrating an example of transfer processing that the gateway 300 performs. The content of this transfer processing is substantially the same regardless of the direction of transfer, so this transfer processing will be described below by way of an example of a case of transferring a message that the gateway 300 has received from the bus 200a to the bus 200b.

First, the frame transmission/reception unit 310 reads out a message from the bus 200a (step S1101). The frame transmission/reception unit 310 transfers the data of the fields of the message that has been read out to the frame interpreting unit 320.

Next, the frame interpreting unit 320 cooperates with the reception ID determining unit 330 to determine whether or not the message that has been read out is a message that is the object of reception and processing, from the ID field value (message ID) thereof (step S1102). In a case where the frame interpreting unit 320 determines that this is not a message that is the object of processing (No in step S1102), this message is not transferred.

In a case of having determined in step S1102 that the message is an object of reception and processing (Yes in step S1102), the frame interpreting unit 320 transfers the values of each of the fields within the message to the frame processing unit 350. Thereafter, the frame processing unit 350 decides the bus for the destination of transfer, following transfer rules stored in the transfer rule storing unit 360 (step S1103).

The frame processing unit 350 notifies the unauthorized activity detection processing function group 370 of the values of each of the fields in the message received from the frame interpreting unit 320, and requests determination regarding whether an attack message or not.

The unauthorized activity detection processing function group 370 determines whether or not the notified message is an attack message, from the values of each of the fields of the message notified thereto (step S1104), and notifies the frame processing unit 350 of the results of determination. In a case where the unauthorized activity detection processing function group 370 has determined that this is an attack message (Yes in step S1104), transfer of this message is not performed.

In a case where determination is made in step S1104 that the message is not an attack message but is a normal message (No in step S1104), the frame processing unit 350 requests the frame generating unit 380 to transfer that message to the transfer destination bus decided in step S1103. Upon receiving the request from the frame processing unit 350, the frame generating unit 380 generates a message so that the specified transfer destination will receive, and sends this message out to the frame transmission/reception unit 310 (step S1105).

Although determination of whether this message is an attack message or not (step S1104) is performed after deciding the transfer destination of the received message (step S1103) in the above example, this is not restrictive. The transfer destination of this message may be decided after determining whether the received message is an attack message or not. Also, deciding of the transfer destination of the received message and determination of whether an attack message or not may be performed in parallel.

1.10 Advantages

In the present embodiment, the unauthorized activity detection processing function group 370 monitors messages flowing over the network of the onboard network system, and determines whether or not the received messages match communication patterns, thereby determining whether or not an attack message. Communication patterns are patterns relating to change in data values of messages or communication timings, indicating features of attack messages. Such communication patterns are identified and obtained based on information relating to messages that have already been determined to be attack messages. Accordingly, even messages regarding which determination of whether a normal message or attack message has been difficult from just information relating to one reception message for example, such as had been used in conventional unauthorized activity detection, can be determined with high precision. As a result, the safety of the onboard network system can be improved.

Second Embodiment

2. Overview

An unauthorized activity detection processing function group that uses the above-described communication patterns to decide a message used as a reference (hereinafter also referred to as reference message) for calculating information relating to a reception message that is the object of unauthorized activity detection processing, i.e., for calculation of data values or reception time of the received message, will be described as a second embodiment, with reference to the drawings. Such an unauthorized activity detection processing function group can be included in a gateway instated of the unauthorized activity detection processing function group 370 in FIG. 3. The gateway having this unauthorized activity detection processing function group, and the onboard network system having this gateway, can basically be the same as with the first embodiment, so description of the configuration thereof will be omitted.

2.1 Configuration of Unauthorized Activity Detection Processing Function Group

Figure 12:
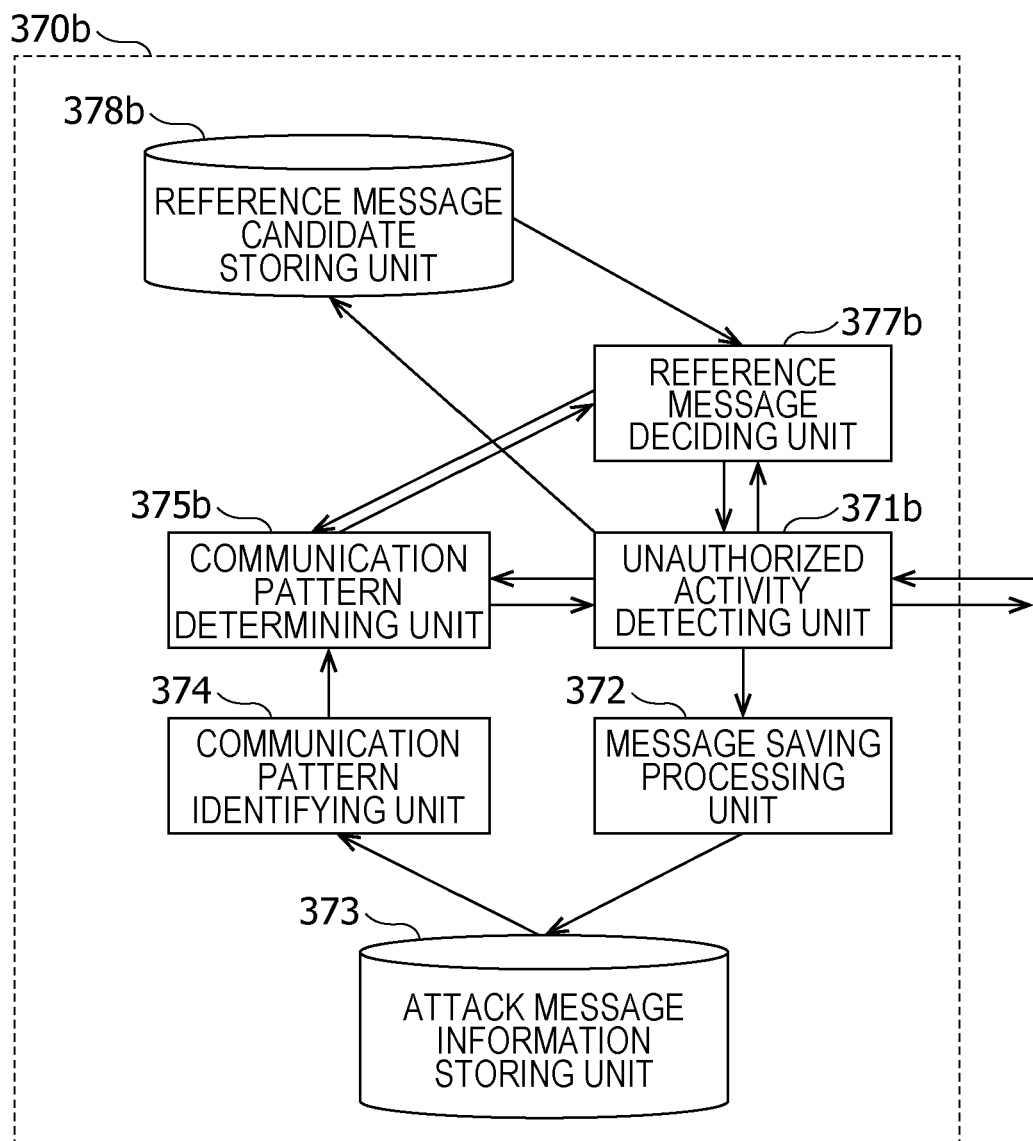
FIG. 12 is a block diagram illustrating an example of the functional configuration of an unauthorized activity detection processing function group according to a second embodiment.

FIG. 12 is a block diagram illustrating the functional configuration of an unauthorized activity detection processing function group 370b according to the present embodiment. In FIG. 12, components that are the same as in FIG. 6 are denoted by the same symbols, and description will be omitted. Part of components that are the same are omitted from illustration. The unauthorized activity detection processing function group 370b will be described primarily with regard to points of difference from the unauthorized activity detection processing function group 370.

In addition to the configuration of the unauthorized activity detection processing function group 370 according to the first embodiment, the unauthorized activity detection processing function group 370b includes a reference message deciding unit 377b and reference message candidate storing unit 378b. The unauthorized activity detection processing function group 370b includes an unauthorized activity detecting unit 371b instated of the unauthorized activity detecting unit 371, and a communication pattern determining unit 375b instead of the communication pattern determining unit 375. Note that these components also are functional components, and are realized by reading out and executing of programs stored in the memory of the gateway by the processing unit, storing of predetermined data by the storing unit, and transmission/reception of data via the input/output unit, and combinations thereof.

The reference message deciding unit 377b decides a reference message used as a reference in calculation of difference in transmission time from one message back with the same ID by the transmission cycle determining function of the unauthorized activity detecting unit 371b, and calculation of the amount of change from one message back with the same ID by the data value determining function.

For example, in a case where a margin of time length a before and after a planned reception time T has been taken into consideration regarding a message periodically transmitted, there are cases where multiple messages are transmitted within that margin. At this time, the reference message deciding unit 377b decides, out of the multiple messages, a message to use as a reference message.

Upon recognizing from the received message that transmission has been made to the next reception cycle, the unauthorized activity detecting unit 371b requests the reference message deciding unit 377b to obtain a reference message.

The reference message deciding unit 377b obtains information relating to messages that are candidates for the reference message, from the reference message candidate storing unit 378b, and decides a message to use as the reference message from the candidates, and notifies the unauthorized activity detecting unit 371b. When deciding the reference message, the reference message deciding unit 377b notifies the communication pattern determining unit 375b of the candidates for the reference message. The communication pattern determining unit 375b executes determination regarding whether or not the messages that are candidates agree with one of the communication patterns, or the closeness to the communication patterns.

The reference message deciding unit 377b excludes messages determined to agree with one of the communication patterns or to be close beyond a certain degree, from the results of determination by the communication pattern determining unit 375b. In a case where the number of remaining candidate messages is one at this stage, the reference message deciding unit 377b decides this message to be the reference message. In a case where multiple messages remain as candidates, the reference message deciding unit 377b decides the reference message in accordance with rules decided beforehand.

The message that is closest in actual reception time to the planned reception time T may be decided to be the reference message, for example, in accordance with rules decided beforehand. Also, for example, the message that is a message transmitted at a time after the planned reception time T and the actual reception time is closest to the planned reception time T out of the candidate messages may be decided to be the reference message. Conversely, the message that is a message received at a time before the planned reception time T and the actual reception time is closest to the planned reception time T may be decided to be the reference message. Further, as a separate example, whether to select a message of a time after the planned reception time T or to select a message at a time earlier, may be switched in accordance with whether the message transmitted one back or two back was later or earlier than the planned reception time T. Also, whether to select a message of which the actual reception time is closer to the planned reception time T or to select a message that is farther may be switched, in accordance with whether or not the message was transmitted consecutively.

The rules decided beforehand may be rules where the reference message is decided using a data value. For example, a message that is close to a data value of another message representing data amount of the same type, and having the same ID or a particular different ID, may be decided as being the reference message, or a message including a data value close to a value calculated from the data value of another message representing data amount of the same type may be decided as being the reference message. In a case where the amount of change of data can be predicted, a message of a data value close in comparison to a predicted value thereof may be decided to be the reference message.

The reference message candidate storing unit 378b stores reference message candidates to be presented to the reference message deciding unit 377b. The unauthorized activity detecting unit 371b notifies the reference message candidate storing unit 378b of information relating to messages to be candidates of the reference message, from received messages. The reference message candidate storing unit 378b stores information relating to messages that are candidates of the reference message, notified from the unauthorized activity detecting unit 371b, and notifies the reference message deciding unit 377b of information relating to messages that are candidates for the reference message, in accordance with the request from the reference message deciding unit 377b.

Note that while an arrangement has been described above where, upon recognizing that transmission has been made to the next reception cycle from received messages, the unauthorized activity detecting unit 371b commissions the reference message deciding unit 377b to obtain the reference message, this is not restrictive. For example, an arrangement may be made where when the first message is received within the margin of the planned reception time T, information relating to the received message is stored in the reference message candidate storing unit 378b as a reference message candidate, and thereafter, each time a message is received within the margin of the planned reception time T, the reference message deciding unit 377b is requested to decide the reference message.

In this case, the reference message deciding unit 377b takes the newly-received message as a reference message candidate, and decides which of this and the reference message candidate that the reference message candidate storing unit 378b stores to keep as a reference message candidate. This decision is made following rules used to decide the reference message described above. The reference message candidate that remains as a result of this decision continues to be stored at the reference message candidate storing unit 378b. Thereafter, the reference message candidate remaining at the point of transitioning to the next reception cycle becomes the reference message used next. Accordingly, only one message needs to be always stored as a reference message candidate, so resources for storing candidates can be conserved.

Now, an arrangement has been described where when deciding a reference message from the reference message candidates, the reference message deciding unit 377b excludes several candidates from the candidate messages, based on the results of determination by the communication pattern determining unit 375b, and decides the reference message from the remaining candidate messages following rules decided beforehand, but this is not restrictive. For example, the reference message deciding unit 377b may first narrow down the candidates following rules decided beforehand, and thereafter request the communication pattern determining unit 375b for communication pattern determination, and decide the reference message in accordance with the determination results. Also, in a case where determination is made at the communication pattern determining unit 375b that all candidate messages agree with some sort of communication pattern, or in a case where determination is made that none of the candidate messages can become a reference message as the result of determination by rules decided beforehand, i.e., in a case where all candidate messages have been determined to be inappropriate as a reference message, the reference message deciding unit 377b may decide there to be no reference message. Alternatively, a rule to be used in a case where determination is made that all of the candidate messages are inappropriate as a reference message may be defined separately, with the reference message deciding unit 377b deciding a reference message following this rule.

The rule defined separately may be a rule with a dedicated definition. For example, this may be a rule for deciding a reference message that has been decided beforehand, or a rule where the appropriateness of a reference message is scored when determining communication patterns, with the reference message being decided based on that score.

Also, a rule may be defined where, in a case of the communication pattern determining unit 375b determining that all candidate messages agree with some sort of communication pattern, rules decided beforehand are applied to all candidate messages again, and a reference message is decided. Conversely, a rule may be defined where, in a case where determination is made that none of the candidate messages can be a reference message as the result of judgement by a rule decided beforehand, the communication pattern determining unit 375b is inquired again regarding all the reference messages, and the reference message is decided in accordance with the results thereof.

Figure 13:
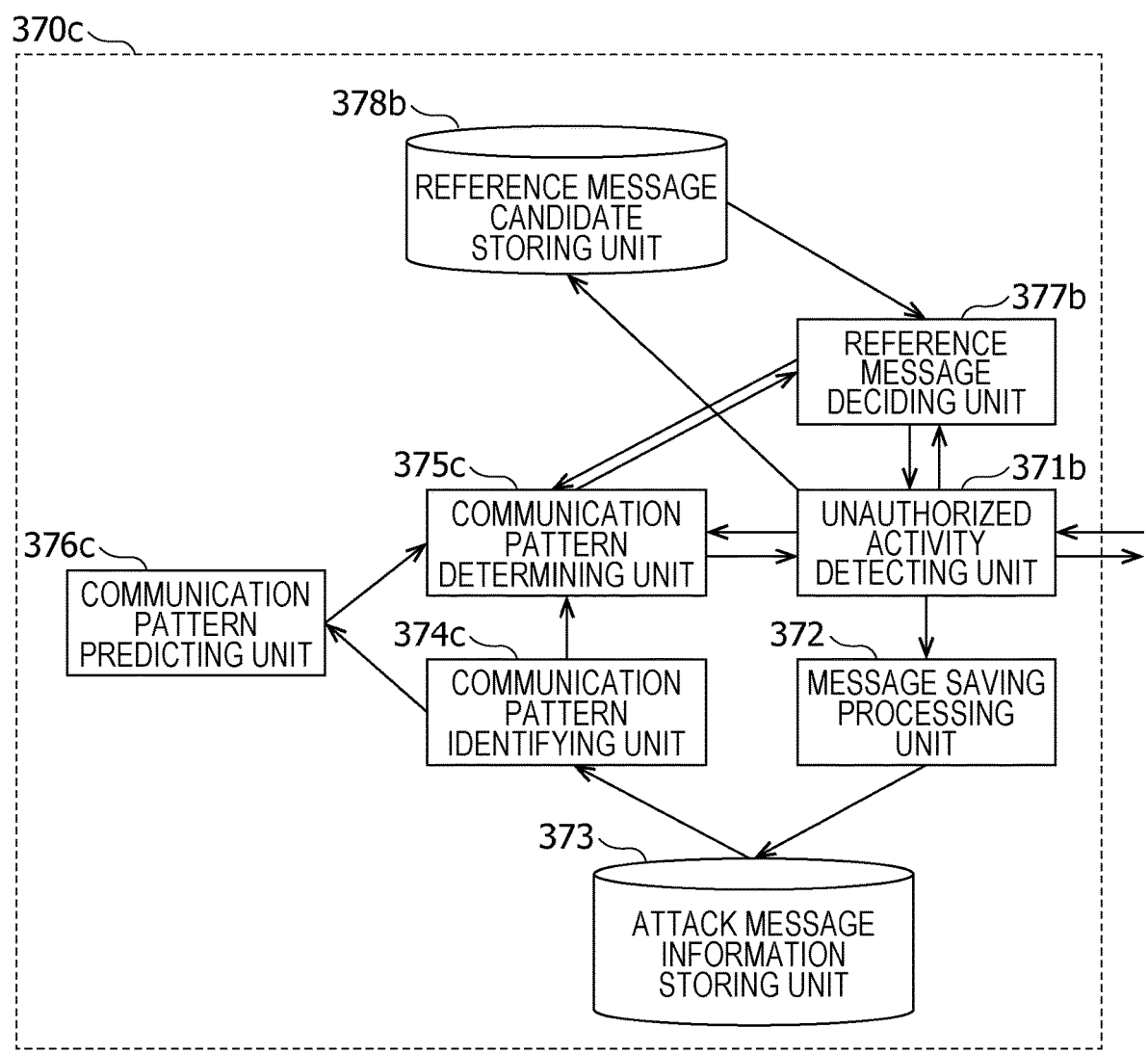
FIG. 13 is a block diagram illustrating another example of the functional configuration of an unauthorized activity detection processing function group according to the second embodiment.

Also, a configuration may be made where information relating to attack messages is modeled and that model is used as a communication pattern for determination of matching with communication patterns, in the same way as the configuration illustrated in FIG. 8 according to the first embodiment. FIG. 13 is a diagram illustrating an example of the configuration of an unauthorized activity detection processing function group 370c according to the present embodiment, that determines a model obtained by modeling information relating to attack messages as a communication pattern, in determination of matching with communication patterns. The unauthorized activity detection processing function group 370c may replace the unauthorized activity detection processing function group 370b and be included in the gateway 300 according to the first embodiment.

The communication pattern determining unit 375c has the same functions as the communication pattern determining unit 375b, and further has a function of determining communication patterns using prediction values by a communication pattern predicting unit 376c.

The communication pattern predicting unit 376c has the same functions as the communication pattern predicting unit 376a, and has a function of notifying prediction values in response to requests from a communication pattern determining unit 375c. This prediction value is calculated by the communication pattern predicting unit 376c using a model identified by a communication pattern identifying unit 374c as a communication pattern.

The communication pattern identifying unit 374c has the same function as the communication pattern identifying unit 374a.

These components of the unauthorized activity detection processing function group 370c also are function components, and are realized by reading out and executing of programs stored in the memory of the gateway by the processing unit, storing of predetermined data by the storing unit, and transmission/reception of data via the input/output unit, and combinations thereof.

2.2 Unauthorized Activity Detection Processing

Figure 14:
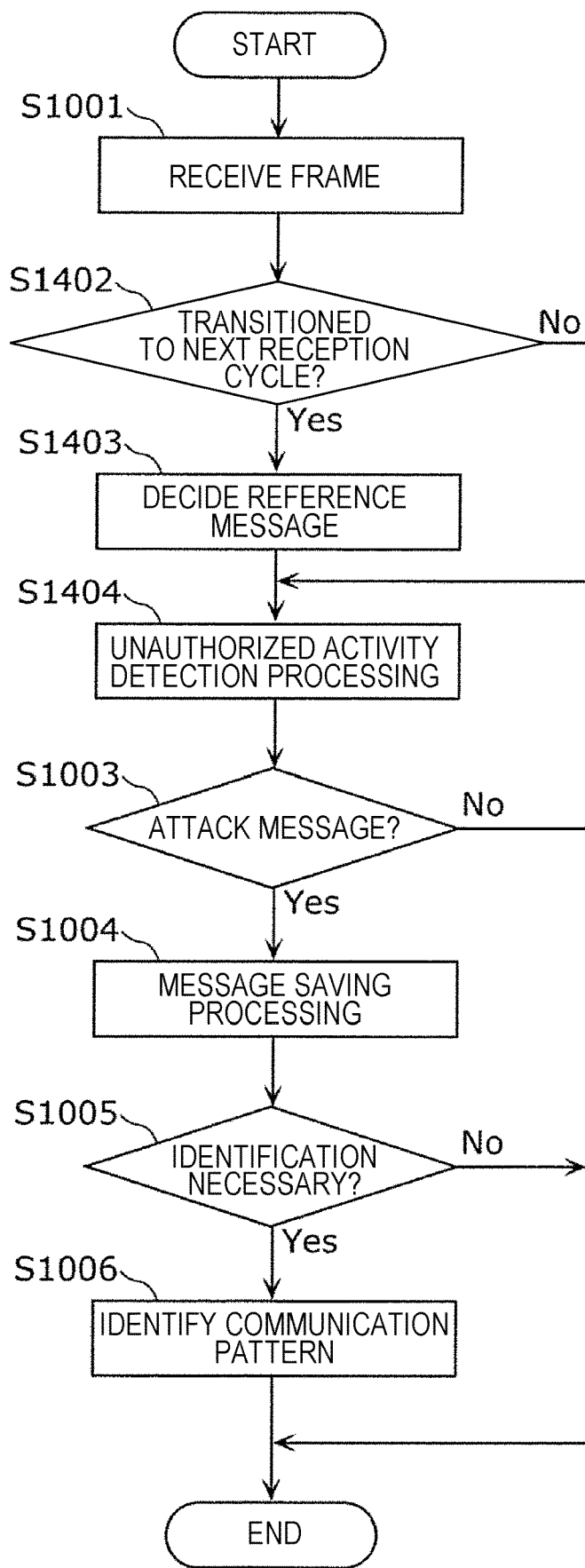
FIG. 14 is a flowchart illustrating an example of unauthorized activity detection processing according to the second embodiment.

FIG. 14 is a flowchart illustrating an example of unauthorized activity detection processing at the unauthorized activity detection processing function group 370b. Steps that are the same as in FIG. 10 are denoted with the same symbols in FIG. 14, and part of the description will be omitted.

First, the unauthorized activity detecting unit 371b receives a message from the frame processing unit 350 (step S1001).

The unauthorized activity detecting unit 371b that has received the message determines whether the reception cycle of a message transmitted periodically has transitioned to the next cycle (step S1402).

In a case of the unauthorized activity detecting unit 371b having determined in step S1402 that transitioning to the next reception cycle has occurred, a new reference message is decided (step S1403).

After having decided the new reference message in step S1403, or in a case of having determined in step S1402 that the reception cycle has not transitioned to the next, unauthorized activity detection processing is performed (step S1404).

The unauthorized activity detecting unit 371b uses various types of determining function such as the ID determining function and so forth, to determine whether the received message is an attack message or a normal message. The various types of determination functions of the unauthorized activity detecting unit 371b perform determination using the reference message decided in step S1403, as necessary. The unauthorized activity detecting unit 371b then notifies the results of the determination to the message saving processing unit 372.

Other processing in step S1404 is the same as the unauthorized activity detection processing in step S1002 in FIG. 10. Processing of step S1003 and thereafter is the same as in FIG. 10, so description will be omitted.

2.3 Advantages

In the unauthorized activity detection processing at the unauthorized activity detection processing function group 370b in the present embodiment, when deciding a reference message that the various types of determining functions of the unauthorized activity detecting unit 371b uses is decided, whether or not candidate messages match communication patterns is determined, and the reference message is decided from candidate messages that do not match communication patterns. Accordingly, a situation that conventionally could occur, where an attack message is used as a reference message, and as a result, unauthorized activity detection could not be correctly performed can be suppressed, and whether an attack message or not can be determined with higher precision. As a result, the safety of the onboard network system can be improved.

Third Embodiment

3. Overview

An onboard network system where part of the functions of the unauthorized activity detection processing function group is situated in a server outside of the vehicle, and the gateway and server communicate, will be described as a third embodiment with reference to the drawings.

3.1 Overall Configuration of Onboard Network System

Figure 15:
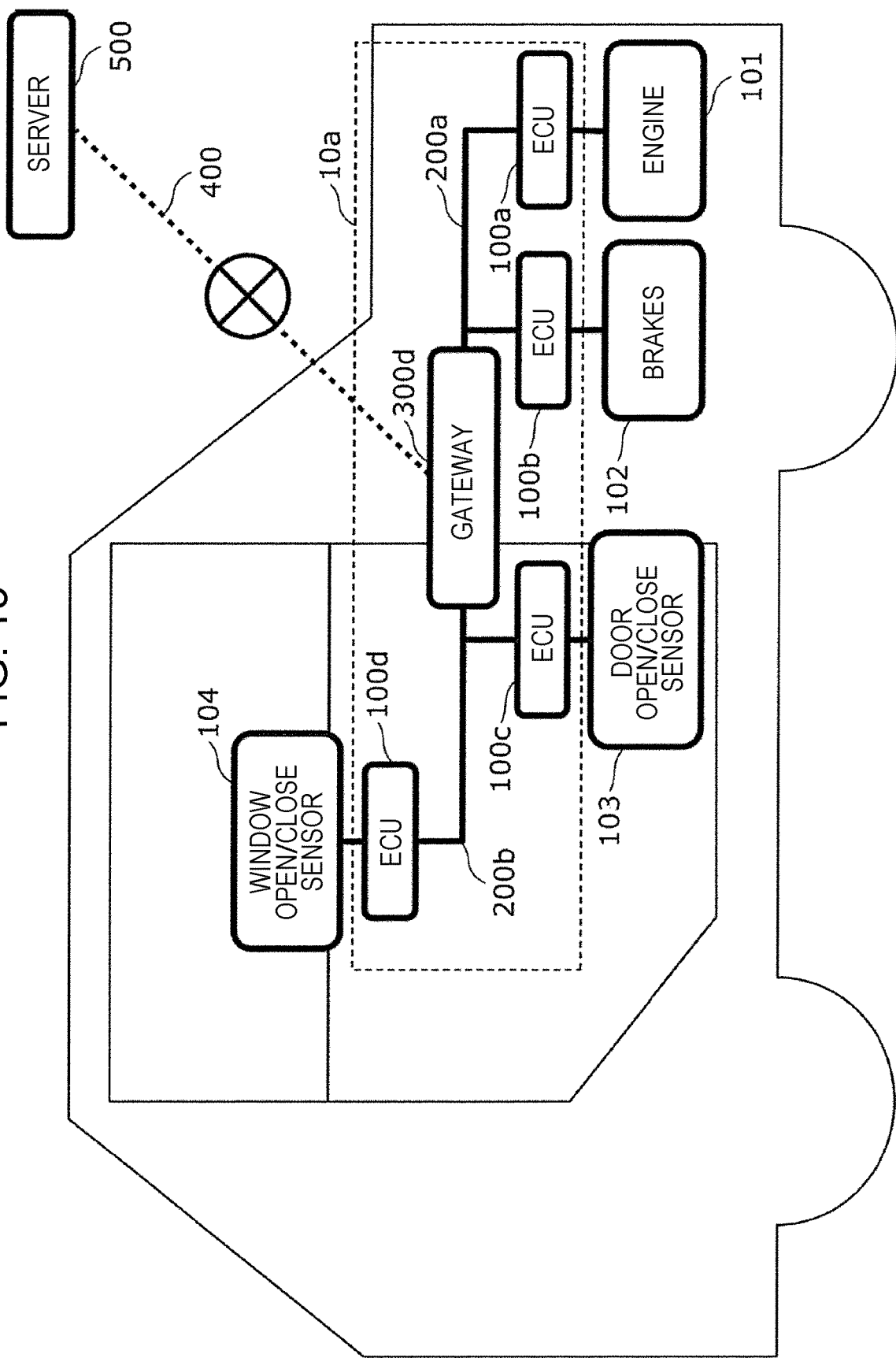
FIG. 15 is a block diagram illustrating the overall configuration of an onboard network system according to a third embodiment.

FIG. 15 is a block diagram illustrating the overall configuration of an onboard network system 10a according to the present embodiment. The components in FIG. 15 that are the same as in the onboard network system 10 illustrated in FIG. 1 are denoted with the same symbols, and description will be omitted.

The onboard network system 10a is configured of a CAN network, and includes ECUs 100 (ECU 100a, ECU 100b, ECU 100c, and ECU 100d in the drawings, also collectively or an unspecified part thereof being referred to as ECU 100 hereinafter), the bus 200 (bus 200a and 200b in the drawings, also collectively or an unspecified one thereof being referred to as bus 200 hereinafter), a gateway 300d, an external network 400 and a server 500.

The gateway 300d is connected to the bus 200a to which the ECU 100a and ECU 100b are connected, and to the bus 200b to which the ECU 100c and ECU 100d are connected. The gateway 300d has a function of transferring a message received from one bus to the other bus. The gateway 300d also is a node on the CAN network.

The external network 400 is a communication network for connecting the gateway 300 and the server 500. The communication method of the external network 400 may be wired or wireless. The wireless communication method may be Wi-Fi, 3G, or LTE, for example, which are existing technologies.

The server 500 performs communication with the gateway 300d via the external network 400. The gateway 300d and the server 500 each share part of the functions of the unauthorized activity detection processing function group 370 in the first embodiment, and perform the above-described unauthorized activity detection processing by the gateway 300d and server 500 operating cooperatively.

3.2 Configuration of Gateway

Figure 16:
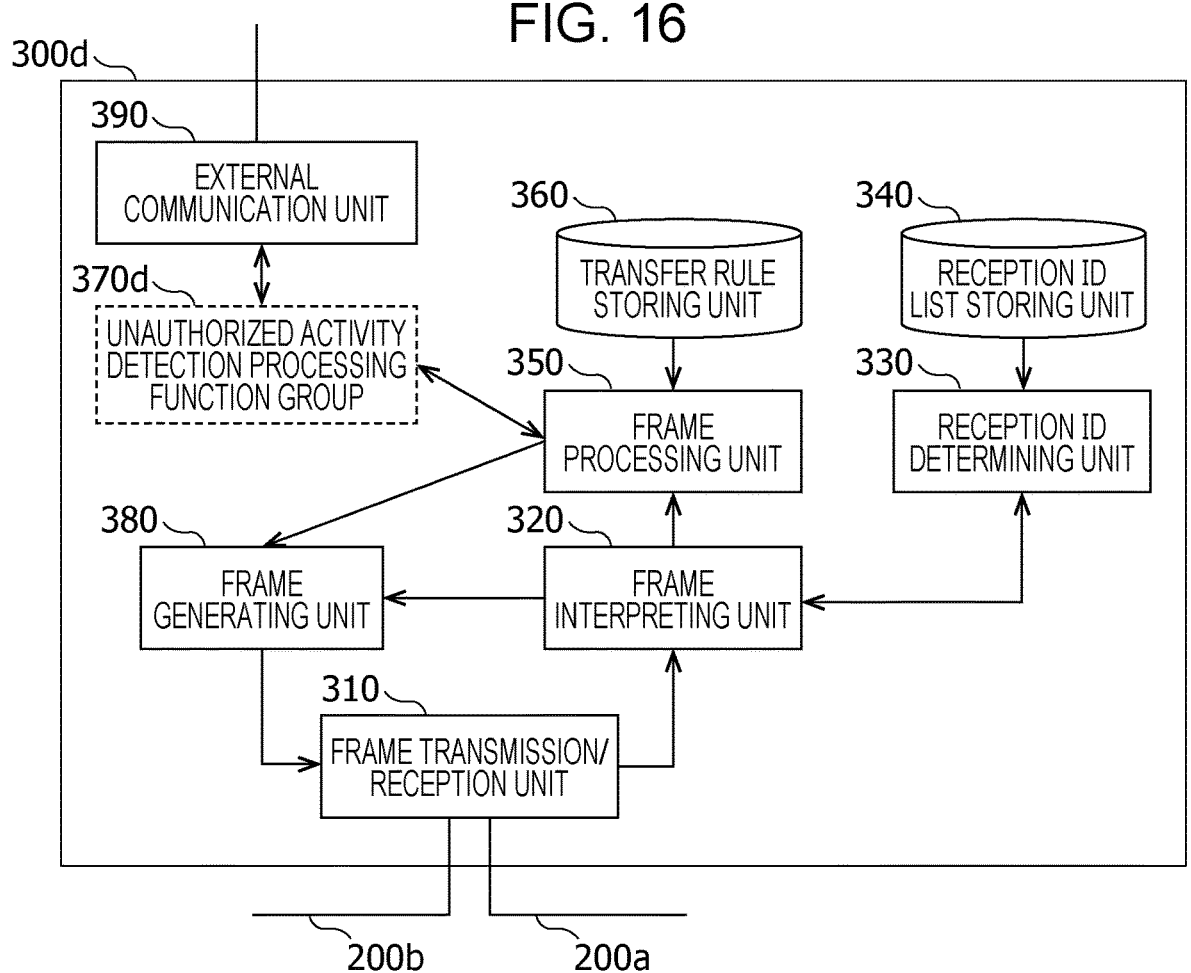
FIG. 16 is a block diagram illustrating another example of the functional configuration of a gateway included in the onboard network system according to the present disclosure.

FIG. 16 is a block diagram illustrating an example of the functional configuration of the gateway 300d. Components in FIG. 16 that are the same as in FIG. 3 are denoted by the same symbols, and description will be omitted. Description will be made below regarding the gateway 300d, primarily with regard to points of difference from the gateway 300.

The gateway 300d differs with regard to the points that it has an unauthorized activity detection processing function group 370d instead of the unauthorized activity detection processing function group 370 in the configuration of the gateway 300, and further has an external communication unit 390. These components also are function components, and are realized by reading out and executing of programs stored in the memory of the gateway 300d by the processing unit, storing of predetermined data by the storing unit, and transmission/reception of data via the input/output unit, and combinations thereof.

The unauthorized activity detection processing function group 370d communicates with the server 500 and executes determination of whether a received message is an attack message or not in cooperation therewith. Details of the configuration included in the unauthorized activity detection processing function group 370d will be described later. The external communication unit 390 performs communication with the server 500.

Figure 17:
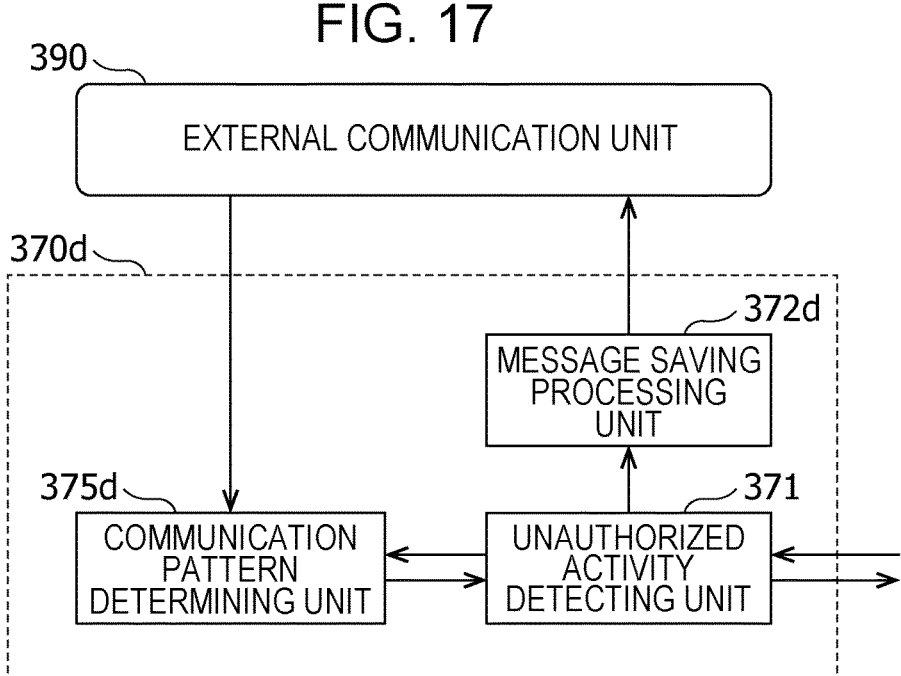
FIG. 17 is a block diagram illustrating an example of the functional configuration of an unauthorized activity detection processing function group according to the third embodiment.

3.3 Configuration of Unauthorized Activity Detection Processing Function Group FIG. 17 is a block diagram illustrating an example of the functional configuration of the unauthorized activity detection processing function group 370d. Components in FIG. 17 that are the same as in FIG. 6 are denoted by the same symbols, and description will be omitted.

The unauthorized activity detection processing function group 370d includes the unauthorized activity detecting unit 371, a message saving processing unit 372d, and a communication pattern determining unit 375d.

In a case of determining that the received message is an attack message and saving is necessary, upon receiving the determination results from the unauthorized activity detecting unit 371, the message saving processing unit 372d communicates with the server 500 via the external communication unit 390, and transmits information relating to the attack message to the server 500 so as to be saved. Saving of a normal message, and determination of whether there is need to save a message or not, are the same as in the first embodiment.

The communication pattern determining unit 375d determines whether or not the received message matches a communication pattern, in response to a determination request from the unauthorized activity detecting unit 371. The communication pattern determining unit 375d performs this determination by communicating with the server 500 via the external communication unit 390, receiving results of identification of communication patterns performed at the server 500, and using the received results.

Figure 18:
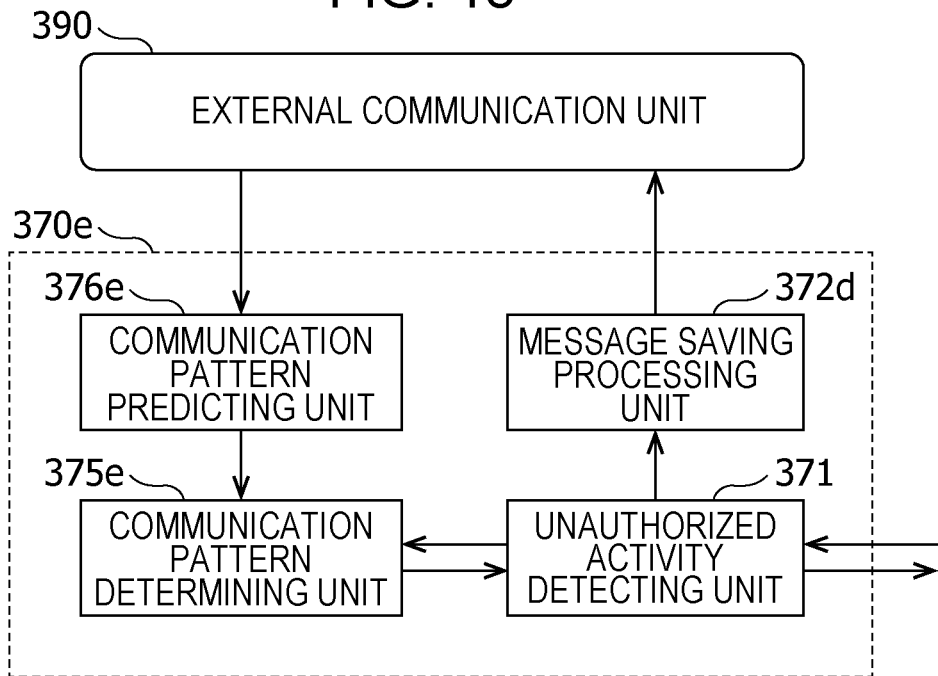
FIG. 18 is a block diagram illustrating another example of the functional configuration of an unauthorized activity detection processing function group according to the third embodiment.

Note that in the identification of communication patterns at the server 500, statistical processing or probability theory may be used to obtain a model of information relating to an attack message, and use the model as a communication pattern, as with the communication pattern identifying unit 374a. In this case, the gateway 300d may have an unauthorized activity detection processing function group 370e further including a communication pattern predicting unit 376e, as illustrated in FIG. 18, instated of the unauthorized activity detection processing function group 370d. FIG. 18 is a block diagram illustrating another example of the functional configuration of the unauthorized activity detection processing function group according to the present embodiment.

The communication pattern predicting unit 376e receives a model identified by the server 500 via the external communication unit 390, and calculates a prediction value using this model as a communication pattern, as with the communication pattern predicting unit 376a. A communication pattern determining unit 375e may determine whether or not agreeing with a communication pattern, from this prediction value and information relating to the received message.

3.4 Configuration of Server

Figure 19:
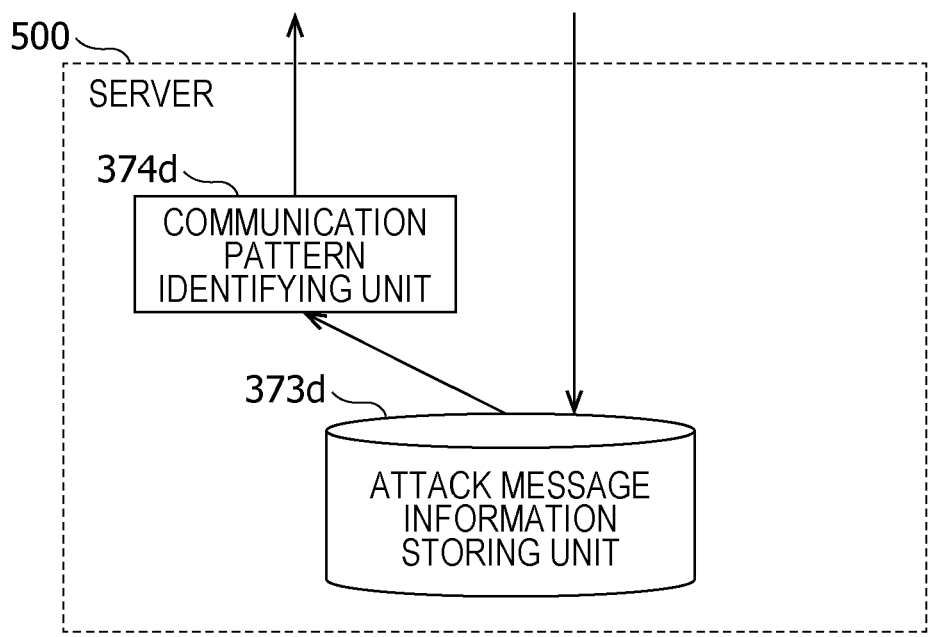
FIG. 19 is a block diagram illustrating an example of the configuration of a server according to the third embodiment.

FIG. 19 is a block diagram illustrating an example of the functional configuration of the server 500. The server 500 has an attack message information storing unit 373d and a communication pattern identifying unit 374d. Note that these components are functional components, and that the server 500 is a so-called server computer that is realized by one or more computers having an information processing device such as a processor, a storage device of semiconductor memory or the like, and input/output unit including an input/output port, and so forth. The functional components listed above are realized by reading out and executing of programs stored in the memory by the processing unit, storing of predetermined data by the storing unit, and transmission/reception of data via the input/output unit, and combinations thereof.

The attack message information storing unit 373d stores information relating to attack messages regarding which saving has been instructed from the message saving processing unit 372d of the gateway 300d. Stored information relating to attack messages is output in response to requests from the communication pattern identifying unit 374d.

The communication pattern identifying unit 374*d* obtains information relating to attack messages from the attack message information storing unit 373*d*, and identifies communication patterns seen in received attack messages. The specific identification method is the same as with the communication pattern identifying units in the above-described embodiments, so description will be omitted.

The communication pattern identifying unit 374*d* transmits identified communication patterns in accordance with requests from the communication pattern determining unit 375*d* or communication pattern predicting unit 376*e* of the gateway 300*d*.

Note that the server 500 may communicate with multiple vehicles, and share part of the functions of the unauthorized activity detection processing function group with the vehicles. In this case, the server 500 may have an individual attack message information storing unit 373*d* and communication pattern identifying unit 374*d* regarding each vehicle, or may have one set of attack message information storing unit 373*d* and communication pattern identifying unit 374*d* for multiple vehicles with which communication is performed. The server 500 may have one set of attack message information storing unit 373*d* and communication pattern identifying unit 374*d* for part of the vehicles with which communication is performed. In a case of having one set as to multiple vehicles, the attack message information storing unit 373*d* stores information relating to attack messages obtained from the vehicles along with information identifying the vehicles.

The communication pattern identifying unit 374*d* may also identify communication patterns from information received from the vehicles in an individual manner, and transmit individual identification results to the vehicles, or identify communication patterns using integrated information from the vehicles and transmit the identification results thereof to the vehicles.

The method of integrating information from the vehicles may be to integrate information from all vehicles, for example, or to integrate by automaker or vehicle type of the vehicles, and further by model and grade. Integration may be performed by vehicle class (size, engine displacement, etc.) of the vehicles, by location of the vehicles, or by functions of the vehicles (automatic driving function, driving assistance function, communication function, etc.). Integration may also be performed according to the type of firmware or software run on the ECUs or the like of the vehicles, and further according to the versions thereof. A combination of such integration methods may be used.

3.5 Advantages

In the present embodiment, the gateway 300 and the server 500 outside of the vehicle communicate, and the server 500 bears part of the functions of the unauthorized activity detection processing function group 370*d* or unauthorized activity detection processing function group 370*e*.

Conventionally, communication patterns were identified only from information collected at individual vehicles, so communication patterns that could be determined were limited. However, saving information in the server 500 in the present embodiment enables communication patterns to be identified from information from multiple vehicles. Accordingly, communication patterns can be speedily or more precisely identified based on a greater number of attack messages. Using these communication patterns at the vehicles enables identification of whether an attack message or not to be determined with higher precision. As a result, safety of the onboard network system can be improved. Also, there is no need to have a large-capacity information storing device in the gateway 300 since information relating to attack messages is stored at the server 500, so manufacturing and maintaining costs of the vehicles can be suppressed.

4. Modifications

It is needless to state that the present disclosure is not restricted to the above-described embodiments, and arrangements where various types of modifications conceivable by one skilled in the art are made to the embodiments, and arrangements configured by combining components in different embodiments, are also included in the scope of the present disclosure, unless departing from the essence of the present disclosure. The following modifications, for example, are also included in the present disclosure.

(1) The unauthorized activity detection processing function group 370*c* has been described in the above embodiments as including the unauthorized activity detecting unit 371, message saving processing unit 372, attack message information storing unit 373, communication pattern identifying unit 374*c*, communication pattern determining unit 375*c*, communication pattern predicting unit 376*c*, reference message deciding unit 377*b*, and reference message candidate storing unit 378*b*, but this is not restrictive.

Figure 20:
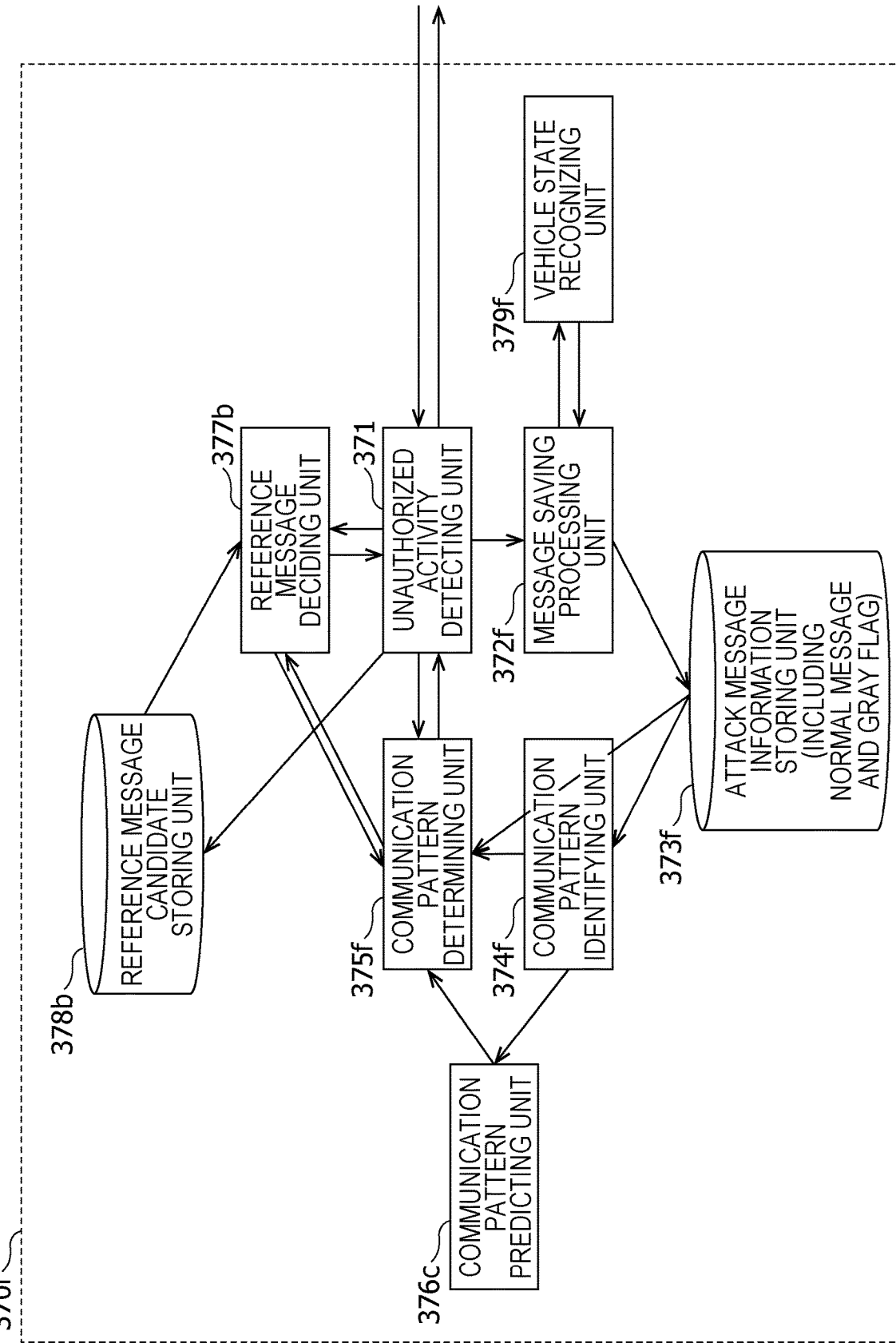
FIG. 20 is a block diagram illustrating an example of the functional configuration of an unauthorized activity detection processing function group according to a modification.

As illustrated in FIG. 20, this may be provided with the unauthorized activity detecting unit 371, a message saving processing unit 372*f*, an attack message information storing unit 373*f*, a communication pattern identifying unit 374*f*, a communication pattern determining unit 375*f*, the communication pattern predicting unit 376*c*, the reference message deciding unit 377*b*, the reference message candidate storing unit 378*b*, and a vehicle state recognizing unit 379*f*. Also, the unauthorized activity detection processing function group in other embodiments (370, 370*a*, 370*b*, 370*d*, 370*e*) may further have the vehicle state recognizing unit 379*f* (omitted from illustration).

Now, the vehicle state recognizing unit 379*f* recognizes what sort of state the vehicle is in, from the contents of CAN messages, the state of various types of switches, and so forth. An example of the state that the vehicle state recognizing unit 379*f* recognizes is a state relating to automatic driving of the vehicle. More specific examples include whether the vehicle is currently in a "normal traveling mode" where the vehicle is traveling with a driver performing most all of driving actions (recognition, judgment, and operating), a "driving assistance mode" where the vehicle is supplementing and assisting part of driving actions, an "automatic driving mode" where the driver performs no driving actions and the vehicle is driving automatically, and so forth. This may also be one of states of the vehicle "traveling", "stopped", and "parked (engine off)". Of these states, multiple states that can be concurrent may be recognized. Alternatively, this may be a state of one or more of various types of functions to realize automatic driving (hereinafter also referred to as automatic driving functions) being valid or invalid.

For example, the message saving processing unit 372*f* may, in addition to information relating to attack messages, store together information indicating state, which the vehicle state recognizing unit 379*f* recognizes and outputs at that time. The message saving processing unit 372*f* may save information relating to attack messages only when having received information indicating a particular state. Also, the communication pattern identifying unit 374*f* and communication pattern determining unit 375*f* may each operate in accordance with predetermined different states indicated by information output by the vehicle state recognizing unit 379*f*.

As a specific example, the communication pattern identifying unit 374f identifies communication patterns during the "normal traveling mode" or at a timing of switching from "normal traveling mode" to "driving assistance mode" or "automatic driving mode". On the other hand, the communication pattern determining unit 375f determines communication patterns when in "driving assistance mode" or "automatic driving mode". As for another example, the communication pattern identifying unit 374f identifies communication patterns while being "stopped" or "parked", and the communication pattern determining unit 375f determines communication patterns when "traveling".

Accordingly, when the vehicle is in a state where attacks can be easily determined, information relating to attack messages is collected and saved, and identification of communication patterns is executed, and determination using communication patterns can be performed when the vehicle is in a state where determination of attacks is difficult. More specifically, when the automatic driving function is not being executed at the vehicle, there is unnecessary output information from sensors connected to ECUs, and control signals from ECUs to actuators and the like also are unnecessary. Accordingly, there is less communication among the nodes as compared to when the automatic driving function is being executed, and attack messages do not readily blend in with other messages, so the precision of determination of attacks tends to be higher. As a result, further improvement in unauthorized activity detection precision and reduction in processing costs can be realized.

Figure 21:
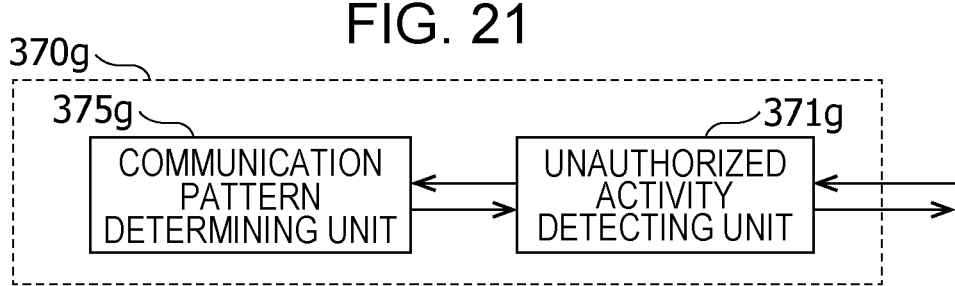
FIG. 21 is a block diagram illustrating another example of the functional configuration of an unauthorized activity detection processing function group according to a modification.

(2) The unauthorized activity detection processing function group 370 has been described as having the unauthorized activity detecting unit 371, message saving processing unit 372, attack message information storing unit 373, communication pattern identifying unit 374, and communication pattern determining unit 375, but this is not restrictive. The unauthorized activity detection processing function group may be configured of fewer components. For example, an unauthorized activity detection processing function group 370g may be made that has an unauthorized activity detecting unit 371g and a communication pattern determining unit 375g, as illustrated in FIG. 21.

Figure 22:
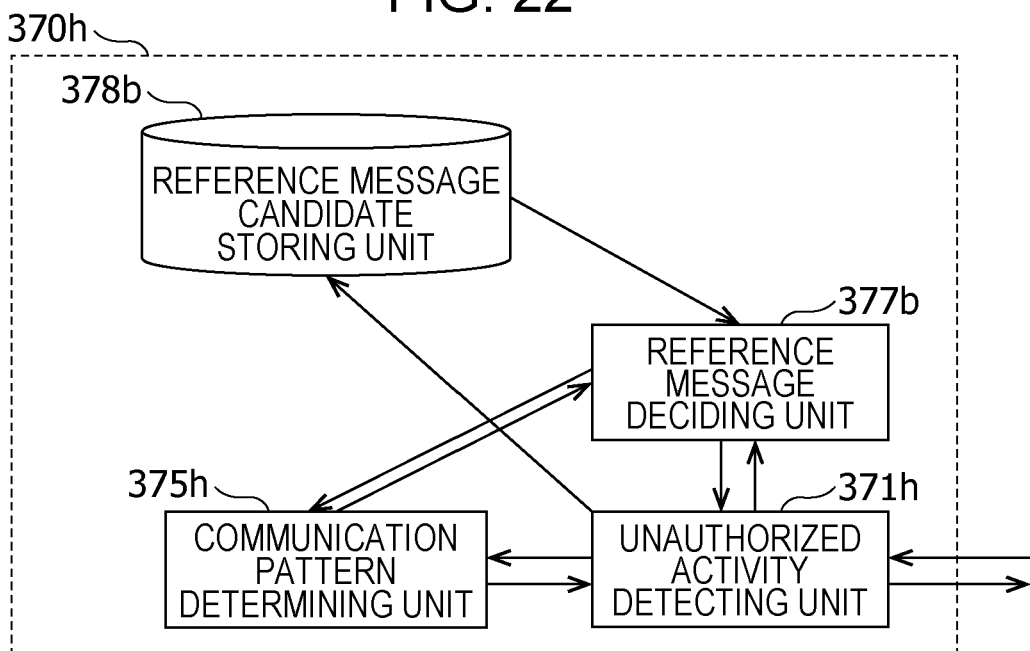
FIG. 22 is a block diagram illustrating another example of the functional configuration of an unauthorized activity detection processing function group according to a modification.

Also, the unauthorized activity detection processing function group 370b has been described as having the unauthorized activity detecting unit 371, message saving processing unit 372, attack message information storing unit 373, communication pattern identifying unit 374, communication pattern determining unit 375, reference message deciding unit 377b, and reference message candidate storing unit 378b, but this is not restrictive. For example, an unauthorized activity detection processing function group 370h may be made with fewer components, which as an unauthorized activity detecting unit 371h, a communication pattern determining unit 375h, and the reference message deciding unit 377b and reference message candidate storing unit 378b, as illustrated in FIG. 22.

In the above, the communication pattern determining unit 375g and communication pattern determining unit 375h store information relating to communication patterns beforehand, and determine whether matching a communication pattern or not using that information. This does away with the need to store attack message information, and the cost of an attack message information storing device to store attack messages can be conserved.

Figure 23:
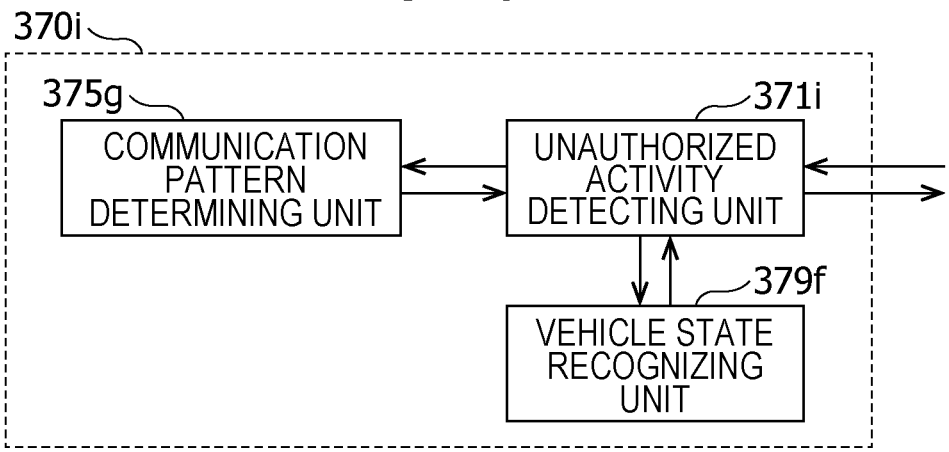
FIG. 23 is a block diagram illustrating another example of the functional configuration of an unauthorized activity detection processing function group according to a modification.

(3) Although the unauthorized activity detection processing function group 370 has been described as having the unauthorized activity detecting unit 371, message saving processing unit 372, attack message information storing unit 373, communication pattern identifying unit 374, and communication pattern determining unit 375, this is not restrictive. As illustrated in FIG. 23, an unauthorized activity detection processing function group 370i may be made that includes an unauthorized activity detecting unit 371i, the communication pattern determining unit 375g, and the vehicle state recognizing unit 379f. In this case, the unauthorized activity detecting unit 371i decides whether to use the determination results of the communication pattern determining unit 375g in unauthorized activity detection processing, in accordance with the state of the vehicle that the vehicle state recognizing unit 379f has recognized.

Accordingly, determination processing by the communication pattern determining unit 375g can be performed at an appropriate timing, and determination processing at unnecessary timings, for example, can be omitted.

(4) The ECUs 100 in the above embodiments have been described has having the frame transmission/reception unit 110, frame interpreting unit 120, reception ID determining unit 130, reception ID list storing unit 140, frame processing unit 150, data obtaining unit 170, and frame generating unit 180, but the configuration of ECUs that the onboard network system according to the present disclosure has is not restricted to this.

Figure 24:
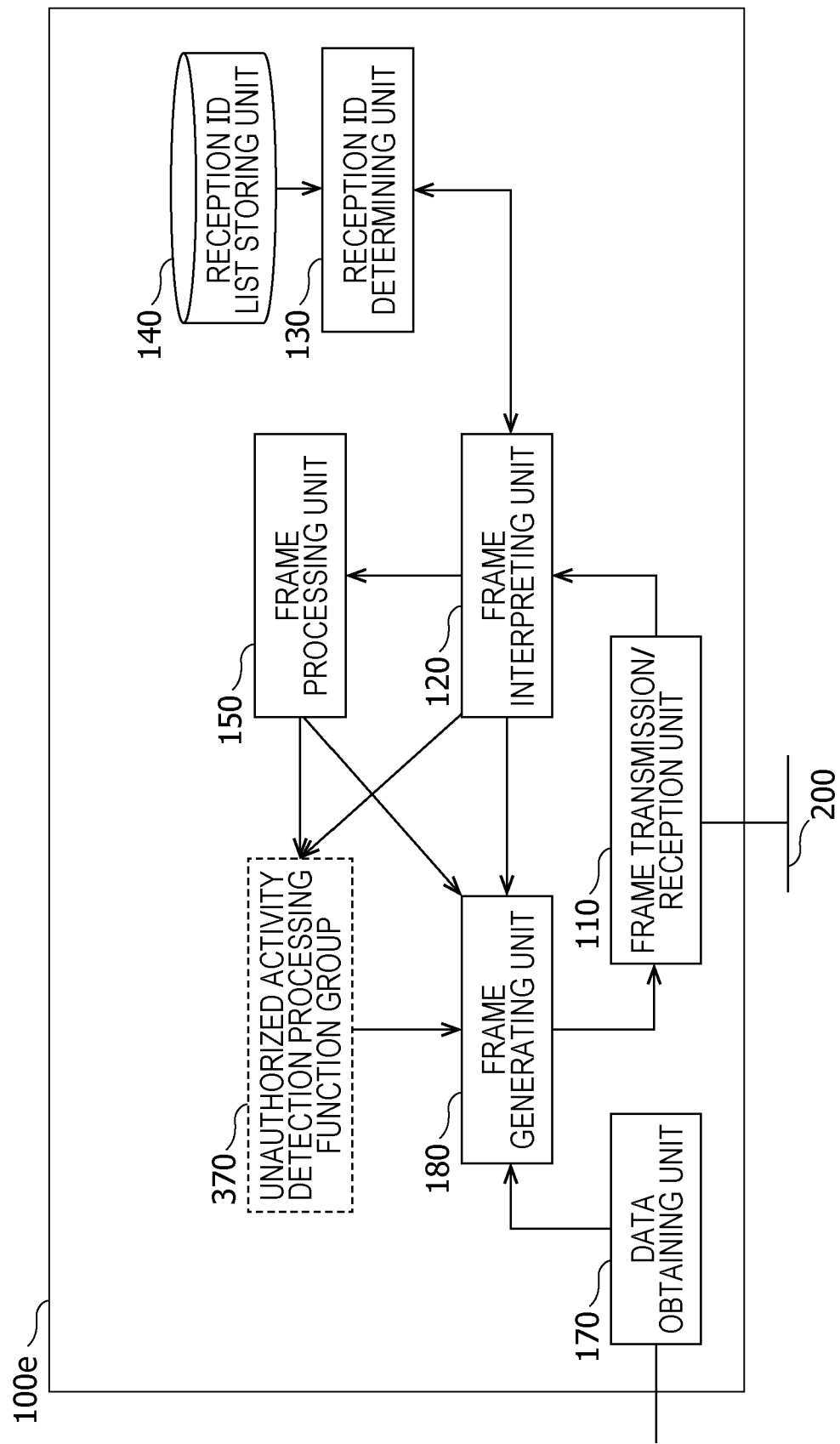
FIG. 24 is a block diagram illustrating an example of the function configuration of an ECU according to a modification.

For example, the ECUs that the onboard network system has may further have the unauthorized activity detection processing function group 370, as with an ECU 100e illustrated in FIG. 24. In this case, determination of whether or not an attack message may be requested to the unauthorized activity detection processing function group 370 by the frame processing unit 150, or may be requested by the frame interpreting unit 120.

Figure 25:
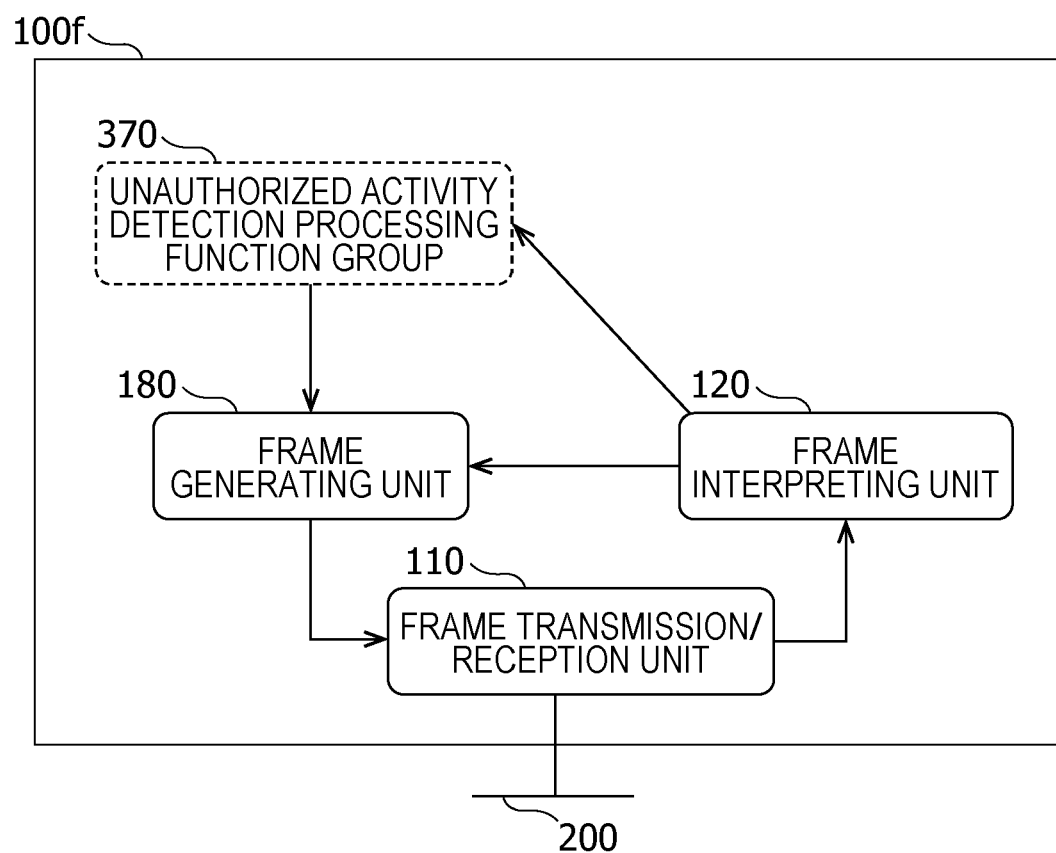
FIG. 25 is a block diagram illustrating an example of the function configuration of an ECU according to a modification.

The ECUs that the onboard network system has may be configured including the frame transmission/reception unit 110, frame interpreting unit 120, frame generating unit 180, and unauthorized activity detection processing function group 370, as with an ECU 100f illustrated in FIG. 25. In this case, the frame interpreting unit 120 may receive all messages regardless of ID, for example, and commission the unauthorized activity detection processing function group 370 to determine whether an attack message or not for all messages.

Also, the ECUs 100 may have, in addition to the configuration in FIG. 25, the reception ID determining unit 130 and reception ID list storing unit 140, only receiving messages having message IDs listed in the reception ID list that the reception ID list storing unit has and commissioning the unauthorized activity detection processing function group 370 to determine whether an attack message or not with regard to these messages. Note that the unauthorized activity detection processing function group 370 may be replaced with any of the above-described 370a through 370i.

Accordingly, not only the gateway but also ECUs can determine whether or not messages transmitted to the bus are attack messages. As a result, redundancy of the system for unauthorized communication detection in the onboard network system is improved, for example, thereby securing safety at a higher level.

Figure 26:
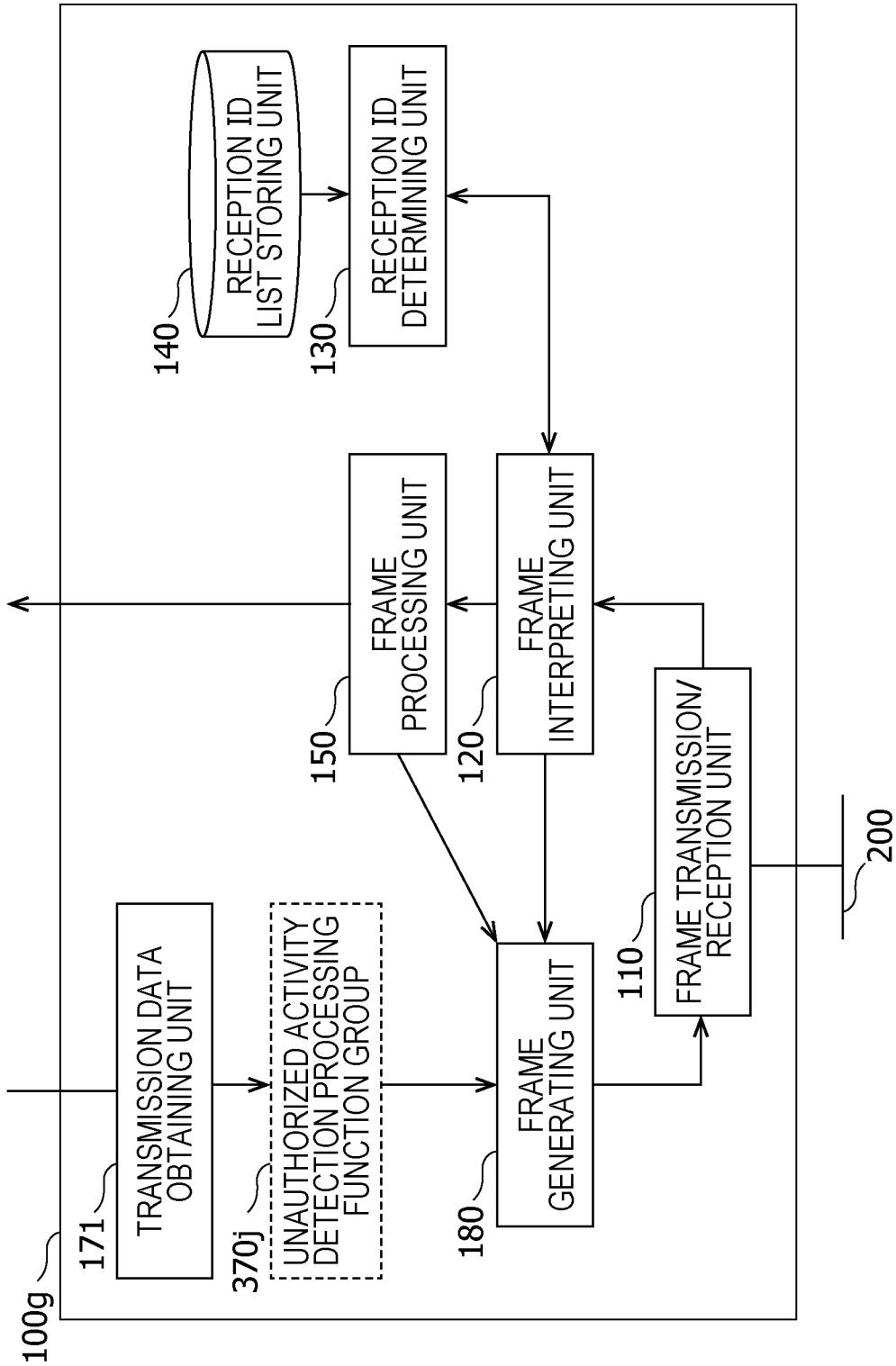
FIG. 26 is a block diagram illustrating an example of the function configuration of an ECU according to a modification.

Further, the ECUs that the onboard network system has may include a transmission data obtaining unit 171 that obtains data for transmission to the bus 200 from other connected devices or externally, or the like, as with an ECU 100g illustrated in FIG. 26. An unauthorized activity detection processing function group 370j that the ECU 100g has may determine whether data received from the transmission data obtaining unit 171 is an attack message or not, and commission the frame generating unit 180 to transmit a message only in a case where determination is made that it is not an attack message. Note that the configuration of the unauthorized activity detection processing function group 370*j* may be the same as any of unauthorized activity detection processing function groups 370 and 370*a* through 370*i*.

Accordingly, in a case where an ECU used along with an automotive navigation system is receiving transmission of attack messages from the automotive navigation system that has been taken over, for example, proliferation of the messages to the network can be suppressed. Also, intrusion into the onboard network system by attack messages which are being attempted to be sent in from outside of the vehicle can be suppressed.

(5) Although an example of not transferring a received message has been illustrated in the above-described embodiments as an action in accordance with detection of unauthorized activity, this is not restrictive. For example, a gateway or ECU having the unauthorized activity detection processing function group described above may perform unauthorized activity detection processing while receiving messages, and at a point of determining that it is an attack message, transmit an error frame, thereby invalidating the message being received from the network. Accordingly, other ECUs connected to the bus where the attack message was discovered can be prevented from receiving the attack message. The same action can also be applied to messages that are not transferred.

Also, a gateway or ECU having the unauthorized activity detection processing function group described above may further perform notification of unauthorized activity to the user or to an external server or the like, recording of a log of occurrence of unauthorized activity, or transitioning the vehicle to a fail-safe mode.

Accordingly, flexible measures can be made following detection of unauthorized activity. Also, multiple messages that have been determined to be attack messages can be handled as one or more systems of data, and learning may be performed for each system with sets of data values or reception intervals as unauthorized activity labels.

(6) Although description has been made in the embodiment above that the message saving processing unit 372 saves information relating to an attack message in a case where the received message is an attack message and saving has been determined to be necessary, this is not restrictive. For example, the message saving processing unit 372 may save information relating to messages that could not be determined to be either an attack message or a normal message when receiving the messages, as gray messages.

Messages stored as gray messages are subjected to determination of whether a normal message or an attack message again, and a predetermined timing. Also, communication patterns may be identified from messages newly determined to be attack messages as a result thereof, and information that had been saved as gray messages may be saved again as information relating to attack messages, to be used along with other information relating to attack messages for identification of communication patterns The timing for determining gray messages may be when a count decided beforehand of information relating to attack messages, such as ten messages for example, have been saved, or by each time decided beforehand such as one minute, or when the state of the vehicle determined by the vehicle state recognizing unit 379*f* has been switched.

Also, the method of determining whether a gray message is a normal message or an attack message may be to perform determination for each message by the unauthorized activity detecting unit 371 again, or to view multiple gray messages as one or more systems of data, and determine whether the system is a system of normal messages or a system of attack messages. For example, gray messages of which data values simply fall within a certain range may be taken as one system to divide the gray messages into multiple systems, and determination may be made regarding each system whether a system or normal messages or a system of attack messages. Also, the gray messages may be divided into multiple systems by determining gray messages in time-sequence where the amount of change in data value is a certain magnitude or greater to be data of a different system, and determination may be made regarding each system whether a system or normal messages or a system of attack messages. Also, dividing into systems may be performed using a clustering technique in the field of machine learning, and determine whether the system is a system of normal messages or a system of attack messages.

As for a method to determine whether a system of normal messages or a system of attack messages, a statistical amount such as variance in difference between the reception times of a normal message and a message one before may be calculated beforehand, for example, and determination be made whether a system of normal messages or a system of attack messages based on which system is closer to the statistical amount calculated beforehand. A system of attack messages may be found by calculation of degree of abnormality through density ratio estimation in reception time differences in a system of normal messages and reception time differences in a system of messages for evaluation.

The timing of identifying communication patterns may be immediately after re-saving gray messages as attack messages, or may be another timing.

(7) Although an example has been described in the above embodiments where the ID is a standard format, but the ID may be an extended format.

(8) Although an example has been described in the above embodiments where messages are transmitted in plaintext, they may be encrypted. Messages may include message authentication code.

(9) Although an example has been described in the above embodiments where data is stored in plaintext, data may be encrypted and stored.

(10) An onboard network system has been illustrated in the above embodiments as an example of a network system that communicates following the CAN protocol. The technology related to the present disclosure is not restricted to use in an onboard network, and may be used in network communication systems that communicate following the CAN protocol other than onboard networks, such as networks of robots, industrial equipment, and so forth.

The CAN protocol has been used as the onboard network in the above-described embodiments, but this is not restrictive. For example, CAN with Flexible Data Rate (CAN-FD), FlexRay, Ethernet, Local Interconnect Network (LIN), Media Oriented Systems Transport (MOST), and so forth, may be used. Further, sub-networks using these networks may be combined for the network.

(11) The devices in the above embodiments each specifically are computer systems configured of a microprocessor, read only memory (ROM), random access memory (RAM), hard disk unit, display unit, keyboard, mouse, and so forth. A computer program is recorded in the RAM or hard disk unit. The devices achieve their functions by the microprocessor operating in accordance with the computer program. Now, a computer program is configured by multiple sets of command codes instructing the computer being combined to achieve predetermined functions.

(12) Part or all of the components configuring the devices in the above-described embodiment may be configured as a single system large scale integration (LSI). A system LSI is a super-multi-functional LSI manufactured integrating multiple components on a single chip, and specifically is a computer system configured including a microprocessor, ROM, RAM, and so forth. A computer program is recorded in the RAM. The system LSI realizes its functions by the microprocessor operating according to the computer program.

The parts of the components making up the above devices may be individually formed into one chip, or part or all may be included in one chip.

Also, while description has been made regarding a system LSI, there are different names such as IC, LSI, super LSI, and ultra LSI, depending on the degree of integration. The circuit integration technique is not restricted to LSIs, and dedicated circuits or general-purpose processors may be used to realize the same. A field programmable gate array (FPGA) which can be programmed after manufacturing the LSI, or a reconfigurable processor where circuit cell connections and settings within the LSI can be reconfigured, may be used.

Further, in the event of the advent of an integrated circuit technology which would replace LSIs by advance of semiconductor technology or a separate technology derived therefrom, such a technology may be used for integration of the functional blocks, as a matter of course. Application of biotechnology and so forth is a possibility.

(13) Part or all of the components of which the above-described devices are configured may be configured as an integrated circuit (IC) card detachably mountable to each device or a standalone module. The IC card or module is a computer system configured including a microprocessor, ROM, RAM, and so forth. The IC card or module may include the above-described super-multifunctional LSI. The IC card or module achieves its functions by the microprocessor operating according to the computer program. The IC card or module may be tamper-resistant.

(14) The present disclosure maybe the method described above. The present disclosure also may be a computer program which realizes these methods by a computer, or may be digital signals made up of the computer program.

The present disclosure also may be the computer program or the digital signals recorded in a computer-readable recording medium, such as for example, a flexible disk, a hard disk, a CD-ROM, MO, DVD, DVD-ROM, DVD-RAM, BD (Blu-ray (registered trademark) Disc), semiconductor memory, or the like. The present disclosure may also be the digital signals recorded in these recording mediums.

The present disclosure may also be an arrangement where the computer program or the digital signals are transmitted over an electric communication line, wireless or cable communication line, a network of which the Internet is representative, data broadcasting, or the like.

Also, the present disclosure may be a computer system having a microprocessor and memory, where the memory records the computer program, and the microprocessor operates according to the computer program.

The program or the digital signals may be recorded in the recording medium and transported, or the program or the digital signals may be transported over the network or the like, and thereby be executed by another computer system that is independent.

(15) Combinations of the above embodiment and the above modifications may be made.

Technology for detection of unauthorized communication that aims to perform unauthorized control through unauthorized messages, in onboard networks according to one or multiple forms, has been described based on embodiments and modifications thereof. According to these embodiments and modifications thereof, detection of unauthorized communication is performed by a gateway or ECUs connected to an onboard network system and performing communication, or by a combination of these and a server computer. A system, including one or more processors and a memory, that executes such unauthorized communication detection, is referred to as an unauthorized communication detection system in the present disclosure. Accordingly, an unauthorized communication detection system includes arrangement realized by one device such as one gateway connected to an onboard network system, a combination of such a gateway and an ECU, and an arrangement realized by multiple devices, such as a combination with a server computer that is at a remote location from a gateway or ECU.

Also, this technology may be realized as a method including part or all of the steps of processing executed by the components in the above-described embodiments and modifications thereof, or as a program executed by a processor of an unauthorized communication detection system so that the unauthorized communication detection system carries out this method.

Processing that particular components execute in the above-described embodiments and modifications thereof may be executed by other components instead of the particular components. Also, the order of multiple processing may be changed, and multiple processing may be executed in parallel.

The unauthorized communication detection method according to the present disclosure detects unauthorized activity by identifying communication patterns of attack messages, and determining whether or not a received message matches a communication pattern. Accordingly, normal messages can be identified with precision even for messages regarding which distinguishing between normal messages and attack messages has been conventionally difficult, enabling protection of the onboard network.

What is claimed is:

1. An unauthorized communication detection method in an onboard network system that is executed by an information processing system including at least one memory, the onboard network system including a network and one or more electronic control units connected to the network, the unauthorized communication detection method comprising:

receiving, over the network, messages transmitted to the onboard network system;

determining, in a first determination, whether a plurality of the received messages is unauthorized;

storing, in the at least one memory:
  information relating to the plurality of the received messages previously determined as unauthorized in the first determination, and
  a communication pattern identified based on the information relating to the plurality of the received messages previously determined as unauthorized;

executing unauthorized activity detection of determining whether or not one of the messages received from the network is unauthorized;

executing communication pattern determination of determining whether or not the one of the messages matches the communication pattern;

saving information relating to the message in the at least one memory in a case where the one of the messages is unauthorized in the executing unauthorized activity detection; and updating the communication pattern based on information relating to the one of the messages and the information relating to the plurality of the received messages previously determined as unauthorized;

wherein a second, final determination as to whether or not the message is unauthorized is performed based on both a result of the executing unauthorized activity detection and the executing communication pattern determination, wherein a pattern relating to change in a data value included in the plurality of the received messages previously determined as unauthorized is identified as the communication pattern, and wherein the pattern relating to change in the data value is a pattern relating to whether or not there is change in the data value included in the plurality of the received messages previously determined as unauthorized representing a data amount of the same type included in the plurality of messages determined as unauthorized, a pattern relating to amount of increase or decrease of a data amount included in the plurality of the received messages previously determined as unauthorized representing the data amount of the same type, or a pattern relating to difference or ratio between data values included in the plurality of the received messages previously determined as unauthorized representing the data amount of the same type and data values included in the plurality of messages determined as unauthorized representing a data amount of another type.

2. The unauthorized communication detection method according to claim 1, wherein the communication pattern is a pattern relating to communication timing of the plurality of the received messages previously determined as unauthorized.

3. The unauthorized communication detection method according to claim 2, wherein the pattern relating to communication timing of the plurality of the received messages previously determined as unauthorized is a pattern relating to intervals of transmission time of the plurality of the received messages previously determined as unauthorized representing a data amount of the same type included in the plurality of the received messages previously determined as unauthorized, or a pattern relating to a difference in transmission times among a plurality of the received messages previously determined as unauthorized representing the data amount of the same type or between the plurality of the received messages previously determined as unauthorized representing data amounts of different types.

4. The unauthorized communication detection method according to claim 1, wherein the communication pattern is a model obtained by executing statistical processing on the information relating to the plurality of the received messages previously determined as unauthorized, wherein, in the executing communication pattern determination, a prediction value of data value included in the one of the messages is calculated using the model, and whether or not the one of the messages matches the communication pattern is determined based on a result of comparison between the prediction value and the data value that the message includes.

5. The unauthorized communication detection method according to claim 4,

Wherein the model is an autoregressive (AR) model, autoregressive-moving-average (ARMA) model, Hidden Markov Model (HMM), or Bayesian model.

6. The unauthorized communication detection method according to claim 4, wherein, in the saving, information relating to a gray message regarding which determination of whether the one of the messages is unauthorized or not could not be made in the executing unauthorized activity detection is further stored in the at least one memory, and wherein, in the updating, the communication pattern is updated based on the information relating to the gray message and the information of relating to the plurality of the received messages previously determined as unauthorized.

7. The unauthorized communication detection method according to claim 1, further comprising:

recognizing whether or not an automatic driving function that a vehicle in which the onboard network system is installed has, for assisting or substituting at least part of driving actions of the vehicle by the driver, is being executed, wherein the saving is executed when recognition is made in the recognizing that the automatic driving function is not being executed, and wherein the executing communication pattern determination is executed when recognition is made in the recognizing that the automatic driving function is being executed.

8. The unauthorized communication detection method according to claim 1, wherein the one of the messages that is determined as unauthorized is received from the network by one of the one or more electronic control units included in the onboard network system, and wherein at least part of the executing unauthorized activity detection, the saving, the updating, and the executing communication pattern determination is executed by an electronic control unit included on a different onboard network system from the electronic control unit receiving the one of the messages that is determined as unauthorized, or by a gateway that the onboard network system further includes.

9. The unauthorized communication detection method according to claim 1, wherein at least one of the one or more electronic control units included in the onboard network system has a transmission data obtaining unit that obtains data transmitted from outside of the onboard network system, and wherein the electronic control unit having the transmission data obtaining unit executes at least the executing unauthorized activity detection regarding the one of the messages included in data transmitted from outside of the onboard network system.

10. An unauthorized communication detection system to detect unauthorized control in an onboard network system, the onboard network system including a network and one or more electronic control units connected to the network, the unauthorized communication detection system comprising:

at least one processor; and one or more memories including at least one of an instruction that, when executed by the at least one processor, causes the at least one processor to perform operations including:

receiving, over the network, messages transmitted to the onboard network system;

determining, in a first determination, whether a plurality of the received messages is unauthorized;

storing, in the one or more memories:
information relating to the plurality of the received messages previously determined as unauthorized in the first determination, and
a communication pattern identified based on the information relating to the plurality of the received messages previously determined as unauthorized;

executing unauthorized activity detection of determining whether or not one of the messages received from the network is unauthorized, executing communication pattern determination of determining whether or not the one of the messages matches the communication pattern;

saving information relating to the message in the one or more memories in a case where the one of the messages is unauthorized in the executing unauthorized activity detection, and updating the communication pattern based on information relating to the one of the messages and the information relating to the plurality of received messages previously determined as unauthorized, wherein a second, final determination as to whether or not the message is unauthorized is performed based on both a result of the executing unauthorized activity detection and the executing communication pattern determination, wherein a pattern relating to change in a data value included in the plurality of the received messages previously determined as unauthorized is identified as the communication pattern, and wherein the pattern relating to change in the data value is a pattern relating to whether or not there is change in the data value included in the plurality of the received messages previously determined as unauthorized representing a data amount of the same type included in the plurality of messages determined as unauthorized, a pattern relating to amount of increase or decrease of a data amount included in the plurality of the received messages previously determined as unauthorized representing the data amount of the same type, or a pattern relating to difference or ratio between data values included in the plurality of the received messages previously determined as unauthorized representing the data amount of the same type and data values included in the plurality of messages determined as unauthorized representing a data amount of another type.

11. At least one non-transitory computer-readable recording medium storing a program causing an unauthorized communication detection system to detect unauthorized communication in an onboard network system, the unauthorized communication detection system including at least one processor and at least one memory, the onboard network system including a network and one or more electronic control units connected to the network, the program, when executed by the at least one processor, causes the at least one processor to perform operations including:

receiving, over the network, messages transmitted to the onboard network system;

determining, in a first determination, whether a plurality of the received messages is unauthorized;

storing, in the at least one memory:
information relating to the plurality of the received messages previously determined as unauthorized in the first determination, and
a communication pattern identified based on the information relating to the plurality of the received messages previously determined as unauthorized;

executing unauthorized activity detection of determining whether or one of the messages received from the network is unauthorized, executing communication pattern determination of determining whether or not the one of the messages matches the communication pattern;

saving information relating to the message in the at least one memory in a case where the one of the messages is unauthorized in the executing unauthorized activity detection, and updating the communication pattern based on information relating to the one of the messages and the information relating to the plurality of received messages previously determined as unauthorized, and wherein a second, final determination as whether or not the message is unauthorized is performed based on both a result of the executing unauthorized activity detection and the executing communication pattern determination, wherein a pattern relating to change in a data value included in the plurality of the received messages previously determined as unauthorized is identified as the communication pattern, and wherein the pattern relating to change in the data value is a pattern relating to whether or not there is change in the data value included in the plurality of the received messages previously determined as unauthorized representing a data amount of the same type included in the plurality of messages determined as unauthorized, a pattern relating to amount of increase or decrease of a data amount included in the plurality of the received messages previously determined as unauthorized representing the data amount of the same type, or a pattern relating to difference or ratio between data values included in the plurality of the received messages previously determined as unauthorized representing the data amount of the same type and data values included in the plurality of messages determined as unauthorized representing a data amount of another type.

* * * * *